US007657502B2

(12) United States Patent
Sasaki et al.

(10) Patent No.: US 7,657,502 B2
(45) Date of Patent: Feb. 2, 2010

(54) MULTIMODAL CONTROL DEVICE AND MULTIMODAL CONTROL METHOD

(75) Inventors: Kazuo Sasaki, Kawasaki (JP); Tatsuro Matsumoto, Kawasaki (JP); Ai Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 11/224,033

(22) Filed: Sep. 13, 2005

(65) Prior Publication Data
US 2006/0259450 A1    Nov. 16, 2006

(30) Foreign Application Priority Data
May 13, 2005   (JP)   ............................. 2005-141370

(51) Int. Cl.
*G06F 17/30* (2006.01)
(52) U.S. Cl. ............................. 707/2; 707/10; 707/101; 715/248; 715/249
(58) Field of Classification Search .................. 715/520
See application file for complete search history.

(56) References Cited

U.S. PATENT DOCUMENTS

| | | | |
|---|---|---|---|
| 6,195,694 B1 * | 2/2001 | Chen et al. .................... 709/220 |
| 6,202,100 B1 * | 3/2001 | Maltby et al. ................. 719/329 |
| 6,377,913 B1 | 4/2002 | Coffman et al. .................. 704/8 |
| 6,573,915 B1 * | 6/2003 | Sivan et al. .................... 715/781 |
| 6,839,896 B2 | 1/2005 | Coffman et al. ............... 719/310 |
| 6,859,451 B1 | 2/2005 | Pasternack et al. | |
| 6,957,394 B1 * | 10/2005 | Fernandez et al. ... 707/E17.121 |
| 6,983,307 B2 | 1/2006 | Mumick et al. ............... 709/205 |
| 7,028,306 B2 | 4/2006 | Boloker et al. | |
| 7,096,423 B2 * | 8/2006 | Murata ........................ 715/520 |
| 7,216,351 B1 | 5/2007 | Maes | |
| 7,283,973 B1 | 10/2007 | Loghmani et al. | |

| | | | |
|---|---|---|---|
| 2003/0005174 A1 * | 1/2003 | Coffman et al. ............. 709/318 |
| 2003/0037076 A1 * | 2/2003 | Bravery et al. ............... 707/517 |
| 2003/0071833 A1 | 4/2003 | Dantzig et al. | |
| 2003/0088421 A1 * | 5/2003 | Maes et al. ................ 704/270.1 |
| 2003/0182622 A1 | 9/2003 | Sibal et al. | |
| 2003/0218638 A1 | 11/2003 | Goose et al. | |
| 2003/0224734 A1 * | 12/2003 | Takekawa et al. ............. 455/72 |
| 2003/0236673 A1 | 12/2003 | Nakagawa et al. | |

(Continued)

FOREIGN PATENT DOCUMENTS

EP    1 100 013 A2    5/2001

(Continued)

OTHER PUBLICATIONS

Archive.org, "Taking Screenshots with Snaglt6 & SnagIt Studio", Oct. 15, 2003, Retrieved from archive.org <<http://web.archive.org/web/2003101502437/www.ischool.utexas.edu/technology/tutorials/graphics/snagit/index.html>>.*

(Continued)

*Primary Examiner*—Khanh B Pham

(57) ABSTRACT

To provide a multimodal control device and method, wherein existing browsers can be used to achieve synchronization with fine granularity, while making full use of GUI browsability. A multimodal control device comprises input focus managing means for managing input focus items in document data, content generation means for generating content, in accordance with a modality type, from document data within a data input item range including input focus items, and content transmission means for transmitting generated content to the corresponding browser.

13 Claims, 39 Drawing Sheets

U.S. PATENT DOCUMENTS

| | | | |
|---|---|---|---|
| 2004/0019487 A1 | 1/2004 | Kleindienst et al. | |
| 2004/0117804 A1 | 6/2004 | Scahill et al. | |
| 2004/0128342 A1 | 7/2004 | Maes et al. | |
| 2005/0010892 A1 | 1/2005 | McNair et al. | |
| 2005/0102606 A1 | 5/2005 | Sasaki et al. | |
| 2005/0203747 A1* | 9/2005 | Lecoeuche | 704/270.1 |
| 2006/0020704 A1 | 1/2006 | Balasuriya | |
| 2006/0165040 A1* | 7/2006 | Rathod et al. | 370/335 |
| 2006/0168095 A1* | 7/2006 | Sharma et al. | 709/217 |
| 2006/0244768 A1* | 11/2006 | Witwer | 345/661 |
| 2007/0168514 A1* | 7/2007 | Cocotis et al. | 709/225 |

FOREIGN PATENT DOCUMENTS

| | | | |
|---|---|---|---|
| EP | 1 100 013 A3 | | 5/2001 |
| JP | 2001-154852 | | 6/2001 |
| JP | 2003-150440 | * | 5/2003 |
| JP | 2003-281033 | | 10/2003 |
| JP | 2004-21920 | | 1/2004 |

OTHER PUBLICATIONS

TechSmith, "SnagIt 7.2.3 Help File Doc", Mar. 29, 2005, p. 1-10, 82, 83, 114, 139, 188, 191, 250-260, 280.*

Bucker et al, "Enterprise Business Portals with IBM Tivioli Access Manager", Sep. 2002, IBM RedBooks-Tivoli Software, 624 pp., <Retrieved via IBM Mar. 17, 2009>.*

Sukaviriya et al, "Supporting Adaptive Interfaces in a Knowledge-based User Interface Environment", Jan. 1993, Intelligent User Interfaces 1993, p. 107-113, <Retrieved from internet Mar. 18, 2009>.*

Coutaz et al, "Four Easy Pieces for Assessing the Usability of Multimodal Interaction: The Care Properties", Jun. 1995, Proceedings of Interact 1995, p. 1-7, <Retrieved from internet Mar. 18, 2009>.*

Hinckley et al, "Sensing Techniques for Mobile Interactioin", Nov. 2000, ACM UIST 2000, 10 pages, <Retrieved from internet Mar. 18, 2009>.*

Puerta et al, "XIML a common representation for interaction data", Jan. 2001, IUI 2002, ACM Press, p. 214-215, <Retrieved from internet Mar. 18, 2009>.*

Paterno et al, "A unified method for designing interactive systems adaptable to mobile and stationary platforms", Jun. 2003, Interacting with Computers, vol. 15, p. 349-366, <Retrieved from ScienceDirect.com Mar. 18, 2009>.*

Berti et al, "Teresa: A Transformation-based Environment for Designing and Developing Multi-Device Interfaces", Apr. 24, 2004, CHI 2004 Demonstration, p. 793-794, <Retrieved from ACM internet Mar. 18, 2009>.*

Paterno et al, "Design and Development of Multidevice User Interfaces through Multiple Logical Descriptions", Aug. 2004, IEEE Transactions on Software Engineering, p. 507-520, <Retrieved from IEEE Explore Mar. 18, 2009>.*

Paterno, "Multimodality and Multi-device Interfaces", Jul. 2004, W3C Workshop on Multimodal Interaction, W3C.org, France, p. 1-4, <Retrieved from W3C.org Mar. 18, 2009>.*

Bouchet et al, "ICARE Software Components for Rapidly Developing Multimodal Interfaces", Oct. 2004, ICMI 2004, ACM Press, p. 251-258, <Retrieved from ACM Portal Mar. 18, 2009>.*

U.S. Appl. No. 10/834,133, filed Apr. 29, 2004, Kazuo Sasaki, Fujitsu Limited Kawasaki, Japan.

U.S. Office Action mailed May 15, 2006 in co-pending related U.S. Appl. No. 10/834,133 (8 pages).

U.S. Office Action mailed Oct. 31, 2006 in co-pending related U.S. Appl. No. 10/834,133 (11 pages).

U.S. Office Action mailed Apr. 17, 2007 in co-pending related U.S. Appl. No. 10/834,133 (12 pages).

U.S. Office Action mailed Apr. 30, 2008 in co-pending related U.S. Appl. No. 10/834,133 (12 pages).

U.S. Office Action mailed Mar. 31, 2009 in co-pending related U.S. Appl. No. 10/834,133 (12 pages).

Japanese Office Action issued on Feb. 3, 2009 in corresponding Japanese Patent Application 2003-380980 corresponding to related U.S. Appl. No. 10/834,133.

Shinya Ohtsuji et al., "A Study on the Human Machine Interface using Voice in the Off-Board Car-Navigation System", Report of Information Processing Society of Japan, vol. 2002, No. 83, p. 53-60.

* cited by examiner

| Field name | Value |
|---|---|
| Document name | Sheet.1.xml |
| Input focus | 1 |
| Input data | |

Fig. 8

```
<mmml>
<model title=" check item">
<item input_type="type1" label="Is it damaged" />
<item input_type="type1" label="Is it worn away?" />
<item input_type="type2" label="Is pump pressure normal?" />
</model>
<input_types>
<input_type name="type1">
<enumeration value=" yes "><token>yes</token><token>it is</token></enumeration>
<enumeration value=" no "><token>no</token><token>it isn't</token></enumeration>
</input_type>
<input_type name="type2">
<enumeration value =" normal"><token>normal</token></enumeration>
<enumeration value =" abnormal"><token>abnormal</token></enumeration>
</input_type>
</input_types>
</mmml>
```

Fig. 9

```
<html>
<body>
<form method=" post" action=" /result"><center>
<table border=" 1">
  <tr bgColor=" #98FB98"><th>check content</th><th>result</th></tr>
  <tr bgColor=" #FFFF00"> <td>Is it damaged?</td>
    <td><input type=" radio" name=" id1" value=" yes ">yes</input>
      <input type=" radio" name=" id1" value=" no ">no</input>
  </td></tr>
  <tr><td>IS it worn away?</td>
    <td><input type=" radio" name=" id2" value=" yes ">yes</input>
      <input type=" radio" name=" id2" value=" no ">no</input>
  </td></tr>
  <tr><td>Is pump pressure normal?</td>
    <td><input type=" radio" name=" id3" value=" normal">normal</input>
      <input type=" radio" name=" id3" value=" abnormal">abnormal</input>
  </td></tr>
</table>
<input type=" submit" value=" submit"></input>
</center></form>
</body>
</html>
```

Fig. 10

```
<vxml>
<form id="main">
<block><prompt>Start checking</prompt></block>
<field name="id1">
<grammar root="id1">
<rule id="id1">
<one-of><item><token>yes</token><tag>id1="yes"</tag></item>
       <item><token>it is</token><tag>id1="yes"</tag>
</item><item><token>no</token><tag>id1="no"</tag>
</item><item><token>it isn't</token><tag>id1="no"</tag></item>
</one-of></rule></grammar>
<prompt>Is it damaged?</prompt>
<filled>
<submit method="post" next="/report"/>
</filled>
</field>
</form>
</vxml>
```

*Fig. 11*

| Check content | Result |
|---|---|
| Is it damaged? | ○ Yes  ○ No |
| Is it worn away? | ○ Yes  ○ No |
| Is pump pressure normal? | ○ Normal<br>○ Abnormal |

[Submit]

*Fig. 12A*

S: Start checking
S: Is it damaged?
U: No

*Fig. 12B*

| Field name | Value |
|---|---|
| Document name | sheet1.xml |
| Focus location | 2 |
| Input data | id1=No |

*Fig. 13*

```
<html>
<body>
<form method="post" action="/result"><center>
<table border="1">
<tr bgColor="#98FB98"><th>check content</th><th>result</th></tr>
<tr><td>Is it damaged?</td>
<td><input type="radio" name="id1" value="yes">yes</input>
    <input type="radio" name="id1" value="no" checked>no</input>
</td></tr>
<tr bgColor="#FFFF00"> <td>Is it worn away?</td>
<td><input type="radio" name="id2" value="yes">yes</input>
    <input type="radio" name="id2" value="no">no</input>
</td></tr>
<tr><td>Is pump pressure normal?</td>
<td><input type="radio" name="id3" value="normal">normal</input>
    <input type="radio" name="id3" value="abnormal">abnormal</input>
</td></tr>
</table>
<input type="submit" value="submit"></input>
</center></form>
</body>
</html>
```

Fig. 14

```
<vxml>
<form id="main">
<field name="id2">
<grammar root="id2">
<rule id="id2">
<one-of><item><token>yes</token><tag>id2="yes"</tag></item>
<item><token>it is</token><tag>id2="yes"</tag>
</item><item><token>no</token><tag>id2="no"</tag>
</item><item><token>it isn't</token><tag>id2="no"</tag></item>
</one-of></rule></grammar>
<prompt>Is it worn away?</prompt>
<filled>
<submit method="post" next="/report"/>
</filled>
</field>
</form>
</vxml>
```

Fig. 15

| Check content | Result |
|---|---|
| Is it damaged? | ○ Yes  ◎ No |
| Is it worn away? | ○ Yes  ○ No |
| Is pump pressure normal? | ○ Normal<br>○ Abnormal |

[Submit]

*Fig. 16A*

S: Is it worn away?
U: No

*Fig. 16B*

| Field name | Value |
|---|---|
| Document name | sheet1.xml |
| Focus location | 4 |
| Input data | id1=no&id2=no&id3=normal |

*Fig. 17*

```
<html>
<body>
<form method="post" action="/result"><center>
<table border="1">
<tr bgColor="#98FB98"><th>check content</th><th>result</th></tr>
<tr><td>Is it damaged?</td>
<td><input type="radio" name="id1" value="yes ">yes</input>
    <input type="radio" name="id1" value="no" checked>no</input>
</td></tr>
<tr> <td>Is it worn away?</td>
<td><input type="radio" name="id2" value="yes ">yes</input>
    <input type="radio" name="id2" value="no" checked >no</input>
</td></tr>
<tr><td>Is pump pressure normal?</td>
<td><input type="radio" name="id3" value="normal" checked >normal</input>
    <input type="radio" name="id3" value="abnormal">abnormal</input>
</td></tr>
</table>
<input type="submit" value="submit"></input>
</center></form>
</body >
</html>
```

Fig. 18

```
<vxml>
<form id="main">
<field name="mm_ctl_confirm">
<grammar>
<rule id="mm_ctl_confirm"><one-of>
<item><token>yes</token><tag>mm_ctl_confirm="yes"</tag></item>
<item><token>no</token><tag>mm_ctl_confirm="no"</tag></item>
</one-of></rule></grammar>
<prompt>Submit the check result to the center?</prompt>
<filled>
<if cond="mm_ctl_confirm=='yes'">
<submit method="post" next="/result?id1=no&id2=no&id3=normal"/>
<else/> <goto next="/focusmove "/>
</if>
</filled>
</field>
</form>
</vxml>
```

Fig. 19

| Check content | Result |
|---|---|
| Is it damaged? | ◯ Yes ◎ No |
| Is it worn away? | ◯ Yes ◎ No |
| Is pump pressure normal? | ◎ Normal<br>◯ Abnormal |

Submit

*Fig. 20A*

S: Do you want to submit check results to the center?
U: Yes

*Fig. 20B*

```
<mmml>
<model title=" check item">
<item input_type="type1" label="Is it damaged?">no</item>
<item input_type="type1" label="Is it worn away?">no</item>
<item input_type="type2" label="Is pump pressure normal?">normal</item>
</model>
</mmml>
```

Fig. 21

| Field name | Value |
|---|---|
| Document name | Sheet.1.xml |
| Focus Location | 1 |
| Input data | |

*Fig. 23*

```
<define_mapping>
  <item name="id1">
    <modal name="html">html1.jsp</modal>
    <modal name="vxml">vxml1.jsp</modal>
  </item>
  <item name="id2">
    <modal name="html">html1.jsp</modal>
    <modal name="vxml">vxml2.jsp</modal>
  </item>
  <item name="id3">
    <modal name="html">html1.jsp</modal>
    <modal name="vxml">vxml3.jsp</modal>
  </item>
  <item name="submit">
    <modal name="html">html1.jsp</modal>
    <modal name="vxml">vxml4.jsp</modal>
  </item>
</define_mapping>
```

*Fig. 24*

```
<%@ page contentType="text/html; charset=Shift_JIS" %>
<%@ page import="java.util.*" %>
<%
   String bgColor = "bgColor='#FFFF00'";
   String checked = "checked";
   String id1_1="",id1_2="",id2_1="",id2_2="",id3_1="",id3_2="";
   String id1_bgColor="",id2_bgColor="",id3_bgColor ="";

HashMap map = (HashMap)request.getAttribute("DataObject");
   if (map != null) {
     if (((String)map.get("value.id1")).equals("yes")) id1_1 = checked;
     else id1_2 = "checked";
     if (((String)map.get("value.id2")).equals("yes")) id2_1 = checked;
     else id2_2 = "checked";
     if (((String)map.get("value.id3")).equals("yes")) id3_1 = checked;
     else id3_2 = "checked";
   } int focus = (int)map.get("focus");
   if(focus == 1) id1_bgColor = bgColor;
   else if (focus == 2) id2_bgColor = bgColor;
   else if (focus == 3) id3_bgColor = bgColor;
%>

<html>
  <body>
    <form method="post" action="/result"><center>
    <table border="1">
      <tr bgColor="#98FB98"><th>check content</th><th>result</th></tr>
      <tr <%=id1_bgColor%>> <td>Is it damaged?</td>
        <td><input type="radio" name="id1" value="yes" <%=id1_1%>>yes</input>
          <input type="radio" name="id1" value="no" <%=id1_2%>>no</input>
        </td></tr>
```

*Fig. 25A*

```
<tr <%=id2_bgColor%>><td>Is it worn away ?</td>
<td><input type=" radio" name="id2" value=" yes" <%=id2_1%>>yes</input>
    <input type=" radio" name="id2" value=" no" <%=id2_2%>>no</input>
</td></tr>
<tr <%=id3_bgColor%>><td>Is pump pressure normal ?</td>
<td><input type=" radio" name="id3" value=" normal" <%=id3_1%>>normal</input>
    <input type=" radio" name="id3" value=" abnormal" <%=id3_2%>>abnormal</input>
</td></tr>
</table>
<input type=" submit" value=" submit"></input>
</center></form>
</body >
</html>
```

*Fig. 25B*

```
<mm-slice-define>
  <slice modale="html">all</slice>
  <slice modale="chtml">2</slice>
  <slice modale="vxml">1</slice>
</mm-slice-define>
```

| Check content | Result | |
|---|---|---|
| Is it damaged? | ○ Yes | ○ No |
| Is it worn away? | ○ Yes | ○ No |

Next

Fig. 35B

| Check content | Result | |
|---|---|---|
| Is it damaged? | ◉ Yes | ○ No |
| Is it worn away? | ○ Yes | ○ No |

Next

Fig. 35C

| Check content | Result |
|---|---|
| Is pump pressure normal? | ○ Normal ○ Abnormal |

Back  Submit

Fig. 36

| Field name | | Value |
|---|---|---|
| Document name | | Sheet.1.xml |
| Focus location | | 1 |
| Input data | | 1-2 |
| Input item range | CHTML | 1 |
| | VXML | |

```
<html>
  <body>
   <form method="post" action"result.jsp"><center>
   <table border="1">
    <tr bgColor="#98FB98"><th>check content</th><th>result</th></tr>
    <tr bgColor="#FFFF00">
      <td>Is it damaged?</td>
      <td><input type="radio" name="id1" value="yes">yes</input>
        <input type="radio" name="id1" value="no">no</input>
      </td>
    </tr>
    <tr>
      <td>Is it worn away?</td>
      <td><input type="radio" name="id2" value="yes">yes</input>
        <input type="radio" name="id2" value="no">no</input>
      </td>
    </tr>
   </table>
   <a href="/ page &command=nextpage">next</a>
   </center></form>
  </body >
</html>
```

Fig. 37

| Field name | | Value |
|---|---|---|
| Document name | | sheet1.xml |
| Focus location | | 2 |
| Input data | | id1=no |
| Input item range | CHTML | 1-2 |
| | VXML | 2 |

Fig. 38

```html
<html>
  <body>
    <form method="post" action"result.jsp"><center>
    <table border="1">
      <tr bgColor="#98FB98"><th>check content</th><th>result</th></tr>
      <tr>
        <td>Is it damaged</td>
        <td><input type="radio" name="id1" value="yes">yes</input>
          <input type="radio" name="id1" value="no" checked>no</input>
        </td>
      </tr>
      <tr bgColor="#FFFF00">
        <td>Is it worn away?</td>
        <td><input type="radio" name="id2" value="yes">yes</input>
          <input type="radio" name="id2" value="no">no</input>
        </td>
      </tr>
    </table>
    <a href="/ page &command=prevpage">back</a>
    <a href="/ page &command=nextpage">next</a>
    </center></form>
  </body>
</html>
```

Fig. 39

| Field name | | Value |
|---|---|---|
| Document name | | sheet1.xml |
| Focus location | | 3 |
| Input data | | id1=no&id2=no |
| Input item range | CHTML | 3 |
| | VXML | 3 |

Fig. 40

```
<html>
<body>
<form method="post" action="result.jsp"><center>
<table border="1">
<input name="id1" value="no" type="hidden">
<input name="id2" value="no" type="hidden">
<tr bgColor="#98FB98"><th>check content</th><th>result</th></tr>
<tr>
<td>Is pump pressure normal?</td>
<td><input type="radio" name="id3" value="normal">normal</input>
    <input type="radio" name="id3" value="abnormal">abnormal</input>
</td>
</tr>
</table>
<a href="//page &command=prevpage">back</a>
<input type="submit" value="submit"></input>
</center></form>
</body>
</html>
```

Fig. 41

MULTIMODAL CONTROL DEVICE AND MULTIMODAL CONTROL METHOD

BACKGROUND OF THE INVENTION

The present invention relates to a multimodal control method for finely synchronizing a plurality of user interfaces while maintaining an aggregate of input items ("granularity") subject to batch processing set for each interface, and a multimodal control device and program to achieve the same.

DESCRIPTION OF RELATED ART

With the spread of the Internet and progress of Web technology, it has become common for a user to acquire and use a variety of information on the Internet via a Web server using a Web browser. A user uses a terminal connected to the Internet and accesses a Web server to acquire content written in a markup language called HTML (Hyper Text Markup Language). In the terminal used by the user there is installed a Web browser that interprets information acquired via the Web server and displays the content on a screen.

Such Web systems do not merely acquire static content on the server and display the same on a screen, but have evolved as Web applications that based on data input by a user via the Web browser process information to a database or the like on the server and based on the results thereof dynamically generate content and output the same to the browser. With such a constitution, it has become possible for a user to easily use various services on the Internet via the Web browser, such as on-line shopping.

On the other hand, in order to use these Web technologies using voice such as via a telephone, a content markup language called VXML (VoiceXML) has been proposed. With the VoiceXML system, a VoiceXML browser (voice response server) is interposed between a telephone and the Web server and VoiceXML is interpreted by the VoiceXML browser, thereby allowing a user to use services through voice dialog.

Also, recently, attention has been paid to a multimodal interface that aims to improve usability not just through using services using a Web browser, voice and other input/output means (modality) separately but by using services by combining a plurality of modalities.

As a framework to achieve a multimodal interface, the applicant proposed "a modal synchronization control method and multimodal interface system (Japanese Patent Application 2003-380980)." The modal synchronization control method described in Japanese Patent Application 2003-380980 is configured so that a content conversion rule corresponding to modality type of a requesting browser is applied from a content object common to a plurality of modalities to generate content for each modality. Thus, at the time content in one browser changes, content in the other browser changes, thus synchronizing content.

Also, Japanese Laid-open Patent Application 2003-281033 discloses an information providing apparatus and program to achieve the same wherein content for each modality is defined as integrated content, and content corresponding to a modality type is cut out from the integrated content, thereby generating content for each modality.

SUMMARY OF THE INVENTION

It is a precondition for the invention relating to the above described conventional multimodal control method that content granularity for the modalities be the same. For example, when document data having two input items is defined by a modality-independent abstract description format and such abstract content is to be converted into content for each modality, each converted content also has the same two input items.

As a result, when content having a plurality of input items is to be synchronized between a Web browser and VoiceXML browser, results of voice input are reflected on the Web browser just at the time when input has been completed for all input items. Thus, the results of voice input for individual input items cannot be sequentially confirmed on a screen, leading to the problem that the advantages of a multimodal interface are not put to use.

In one conceivable method for solving this problem, content is generated for each input item and a Web browser and VoiceXML browser are caused to carry out execution. In such a case, synchronization at time of input of data for each input item is possible. However, with this method, granularity of content displayed on the Web browser becomes too fine, leading to the problem of the advantages of GUI browsability being lost.

In another conceivable method for solving this problem, a mechanism is provided for controlling input item data in each browser from an external module, and data input results in one browser are acquired by the external module to reflect the same in input item data of another browser. However, because this requires a special browser containing a mechanism for notifying an external module of input in input items for each browser, existing browsers cannot be used.

It is an object of the present invention to solve these problems and to provide a multimodal control method that makes use of GUI browsability and is capable of achieving synchronization with fine granularity using existing browsers.

Another object is to provide a multimodal control method that, with regard to GUI browsability, when the screen size is small such as, for example, with a cell phone Web browser, enables modalities with differing content granularities to be synchronized in accordance with modality characteristics so that, for example, instead of all of input items being displayed at once, they are divided into a plurality of pages.

The multimodal control device relating to a first aspect of the present invention comprises, for each modality type, a browser for interpreting content in accordance with modality type and performing interaction with a user, wherein content containing an input focus item that is currently subject to input is generated from document data constituted by a plurality of data input items, said content being within a data input item range in accordance with the characteristics of each modality, and then is output to each browser, such multimodal control device further comprising: input focus managing means for managing input focus items in the document data; content generation means for generating content from document data and in accordance with modality type, such content being within a data input item range that includes the input focus item; and content transmission means for transmitting generated content to the corresponding browser.

In such a case, for example, while browsability of a browser for GUI modality is maintained, GUI modality browser display is synchronized with input data for each input item of a VoiceXML browser or the like, enabling sequential reflection and display of the input data.

The multimodal control device relating to a second aspect of the present invention is configured such that input focus managing means changes input focus item details when it has been detected that input has been made of data into a data input item from any modality.

In this case, as a result, because input location with regard to a plurality of input items can be moved without explicitly moving input focus, a user can input data for an input item, without worrying about input item subject to input.

The third aspect of the present invention is the multimodal control device wherein with respect to content for a modality having a data input item range of 1, after completion of data input in the plurality of data input items, content generation means generates content to confirm whether to direct transmission of the input data or not.

With such a configuration, input data can be transmitted at the point in time when input of data for a plurality of input items has been completed, without the need for creation of separate procedures for transmission of inputted data.

The multimodal control device relating to a fourth aspect of the present invention is configured such that content generation means further generates, within content for confirmation of transmission, content in which the contents of inputted data is set as transmission data.

With such a configuration, at time of completion of data input in input items, the input data is used to make transmission to a prescribed destination.

The multimodal control device relating to a fifth aspect of the present invention is configured such that the browsers include a browser for GUI modality, and content that specifies the data input item corresponding to input focus location is generated for the browser for GUI modality.

In this case, it can be easily confirmed which input item on a browser for GUI modality having browsability is an input focus item, thereby enabling easy data input.

The multimodal control device relating to a sixth aspect of the present invention is configured such that with respect to the browser for GUI modality, data of interim input results is embedded in an input form as an initial value.

With such a configuration, input data input from another browser can be sequentially reflected on the browser for GUI modality.

The multimodal control device relating to a seventh aspect of the present invention is configured such that when content for browsers is generated from document data comprising a plurality of input items, a character string that is uniform for each data input item is generated, and the character string is set as an input identifier common to the modalities.

With such a configuration, data input can be made with data input items in the document data synchronized among a plurality of browsers. Also, because a uniform character string does not need to be registered in the document data in advance, maintenance of document data changes and the like is facilitated.

The multimodal control device relating to an eighth aspect of the present invention is configured such that document data comprising a plurality of data input items comprises a definition file in which content corresponding to modality type is defined for each data input item, and in accordance with modality type and input focus item, content for each modality corresponding to the relevant data input item is read from the definition file.

In such a case, for example, HTML content and finely granulated VoiceXML content are prepared in advance, and appropriate content is generated in accordance with input focus items and transmitted to a browser.

The multimodal control device relating to a ninth aspect of the present invention is configured such that content is generated in which is embedded a program for notifying multimedia control means of result data of interim input into data input items.

In this case, result data of interim input into data input items can be reflected on other browsers to be synchronized.

The multimodal control device relating to a tenth aspect of the present invention is configured such that content is generated in which is embedded a program for detecting movement of input focus and notifying multimodal control means of input focus item move information.

The programs used may be JACASCRIPT (JAVA is a registered trademark), VBSCRIPT, JAVAPPLET (JAVA is a registered trademark), ACTIVEX CONTROL or other programs in correspondence with execution environment.

With such a configuration, following input focus item movement, appropriate content based thereupon can be generated.

The multimodal control device relating to an eleventh aspect of the present invention comprises, for each modality type, a browser for interpreting content in accordance with modality type and performing interaction with a user, wherein content including an input focus item currently subject to input is generated from document data having a plurality of data input items, such content being within a data input item range in accordance with the characteristics of each modality, and then is output to each browser, such multimodal control device further comprising: input focus managing means for managing input focus items in the document data; generation range managing means for deciding content generation range within a document based on the data input item range defined for each modality type and on input focus item; content generation means for generating content, in accordance with modality type, from document data, based on content generation range; and content transmission means for transmitting the generated content to a corresponding browser.

With such a configuration, even when data input items in the document are displayed divided into a plurality of pages, relationship between input focus item and content to be displayed can be appropriately maintained.

The multimodal control method relating to a twelfth aspect of the present invention comprises, for each modality type, a browser for interpreting content in accordance with modality type and performing interaction with a user, wherein content including an input focus item currently subject to input is generated from document data having a plurality of data input items, such content being within a data input item range in accordance with the characteristics of each modality, and is then output to each browser, such multimodal control device further comprising: a step for managing input focus items in the document data; a step for generating content, in accordance with the modality type, from the document data, within a data input item range that includes the input focus items; and a step for transmitting the generated content to a corresponding browser.

The computer readable recording medium having recorded thereon a program for executing the multimodal control method relating to a thirteenth aspect of the present invention comprises for each modality type, a browser for interpreting content in accordance with modality type and performing interaction with a user, wherein content including input focus items that are currently subject to input is generated from document data having a plurality of data input items, such content being within a data input item range in accordance with characteristics of each modality, and is then output to each browser, such program further comprising: a step for managing input focus items in the document data; a step for generating content, in accordance with the modality type, from the document data, within a data input item range including the input focus items; and a step for transmitting the generated content to a corresponding browser.

BRIEF DESCRIPTION OF THE DRAWINGS

FIG. 8 is a diagram for explaining initial state internal data object;

FIG. 9 is a diagram for explaining document data;

FIG. 10 is a diagram for explaining initial state HTML content;

FIG. 11 is a diagram for explaining initial state VoiceXML content

FIG. 12A is a diagram for explaining examples of an initial state browser screen;

FIG. 12B is a diagram for explaining examples of a dialog;

FIG. 13 is a diagram for explaining an internal data object after data input;

FIG. 14 is a diagram for explaining HTML content after data input;

FIG. 15 is a diagram for explaining VoiceXML content after data input;

FIG. 16A is a diagram for explaining examples of a browser screen after data input;

FIG. 16B is a diagram for explaining examples of a dialog;

FIG. 17 is a diagram for explaining an internal data object after data input;

FIG. 18 is a diagram for explaining HTML content after data input;

FIG. 19 is a diagram for explaining VoiceXML content after data input;

FIG. 20A is a diagram for explaining examples of a browser screen after data input;

FIG. 20B is a diagram for explaining examples of an dialog;

FIG. 21 is a diagram for explaining result data;

FIG. 23 is a diagram for explaining an initial state internal data object;

FIG. 24 is a diagram for explaining a document definition file;

FIG. 25A is a diagram for explaining an HTML1.jsp;

FIG. 25B is a diagram for explaining an HTML1.jsp;

FIG. 34 is a granularity definition file;

FIG. 35A is a diagram for explaining an example of a CHTML browser screen;

FIG. 35B is a diagram for explaining an example of a CHTML browser screen;

FIG. 35C is a diagram for explaining an example of a CHTML browser screen;

FIG. 36 is a diagram for explaining an initial state internal data object;

FIG. 37 is a diagram for explaining an initial state CHTML content;

FIG. 38 is a diagram for explaining an internal data object after data input;

FIG. 39 is a diagram for explaining CHTML content after data input;

FIG. 40 is a diagram for explaining an internal data object after data input; and FIG. 41 is a diagram for explaining CHTML content after data input.

DETAILED DESCRIPTION OF THE PREFERRED EMBODIMENTS

Embodiments employing a multimodal control method relating to the present invention will be explained below.

First Embodiment

Figure 1:
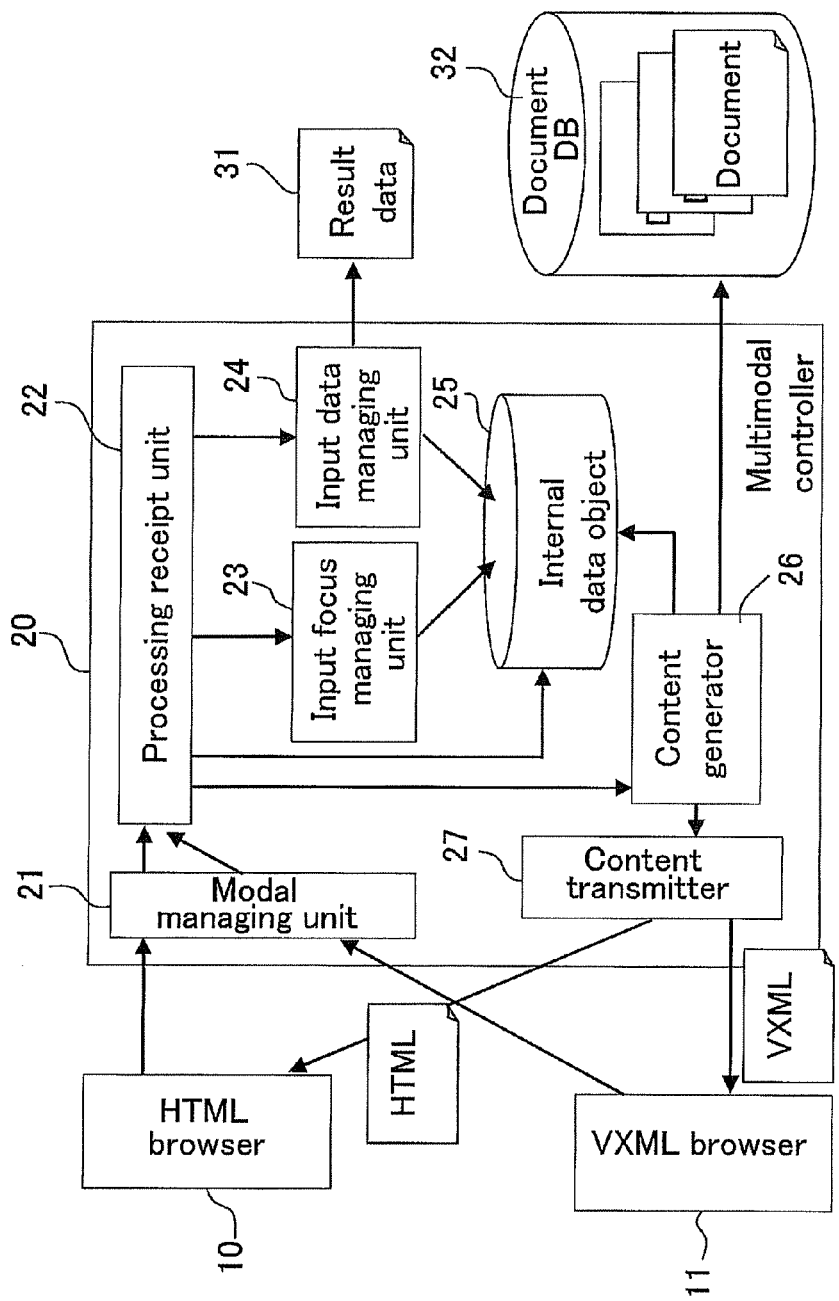
FIG. 1 is a functional block diagram showing a schematic configuration of the first embodiment.

FIG. 1 illustrates the overall constitution of a multimodal control device relating to a first embodiment of the present invention.

The multimodal control device relating to the present invention comprises a browser for each modality such as, for example, an HTML browser and VoiceXML browser, as well as a multimodal controller and a document database.

The first embodiment comprises two browsers, an HTML browser 10 and VoiceXML browser 11. The HTML browser 10, which may be a Web browser such as Internet Explorer of Microsoft, acquires information from a Web server and displays the same on a user terminal, transmits data input by a user in a prescribed input item to a multimodal controller, and displays content generated based on data input by the user on the user terminal.

The VoiceXML browser 11 may be provided on the user terminal side, enabling a user to make direct voice interaction by microphone and speaker. Alternatively, it may be provided on the server side and configured for use via telephone.

A document database 32 for managing a plurality of documents can be a database system, general file system or the like. In an alternative configuration to such a single database system or file system, a document dynamically generated by a network Web application is acquired via HTTP, or an object in memory generated by a different module is acquired and used as a document.

A multimodal controller 20 comprises a modal managing unit 21, processing receipt unit 22, input focus managing unit 23, input data managing unit 24, internal data object storage unit 25, content generator 26 and content transmitter 27.

The modal managing unit 21 manages synchronization of a plurality of browsers, managing a synchronization management table comprising such items as synchronization ID, browser identifier and modal name.

The processing receipt unit 22 receives a processing request from a browser and assigns the processing to the input focus managing unit 23, input data managing unit 24 or content generator 26. A processing request may be, for example, a "new document acquisition request," "interim input results registration request," "input focus move request" or "result data registration request." What a processing request entails can be determined, for example, by a URI (Uniform Resource Identifier: an information resource location) character string contained in the processing request information transmitted from the browser.

A new document acquisition request is a request instructing new transmission to a browser of a new document comprising a plurality of input items. An interim input results registration request is a request instructing registration of data input in an input item. An input focus move request is a request instructing transition of input item subject to input. A result data registration request is a request for final submission of data input into input items. A standard web system will have new document acquisition requests and result data registration requests, but in the present invention an interim input results registration request and input focus move request have been added.

The input focus managing unit 23 carries out processing to move input focus based on an input focus move request and interim input results registration request received by the processing receipt unit 22. Specifically, based on a received focus location move request, an input item in a document currently being processed is moved, and the moved input item is registered in the internal data object storage unit 25 as the new focus location.

The input data managing unit 24, based on an interim input results registration request received by the processing receipt unit 22, registers interim input results for the relevant input item in the internal data object storage unit 25. Also, when the processing request receiving unit 22 receives a result data registration request, the input data managing unit 24 writes the received result data to the result data file 31. In an alternative configuration, result data is not only written to the result data file 31, but is written to a database or also transmitted to a server that performs a corresponding service on a network.

The content generator 26, in accordance with data stored in the internal data object storage unit 25, reads a document from the document database 32 and performs content conversion processing in accordance with modality type. In content conversion processing for a GUI modality such as the HTML browser 10, an entire document is subject to content conversion; for a voice modality such as the VoiceXML browser 10, the input at the input focus location is subject to content conversion. As a result, for content to be converted for the VoiceXML browser 11, depending on input focus transition, differing input items will be subject to content conversion. On the other hand, for content to be converted for the HTML browser 10, all input items are subject to content conversion, irrespective of input focus movement. At such time, to visually specify input focus location, content can be generated in which a background color of an input item currently subject input focus is changed.

Methods for converting content include conversion in which, for example, XSL (Extensible Style sheet Language) for HTML conversion and XSL for VoiceXML conversion are prepared and XSLT (XSL Transformations) is used (http://www.w3.org/TR/xslt of W3C). In this case, the definitions determining the modality for which content is to be more finely granulated are defined in the XSL for each modality. In the present embodiment, for content for the HTML browser 10, the entire document data is subject to content conversion, and for content for the VoiceXML browser 11, only input focus input items are subject to content conversion.

The content transmitter 27 transmits content generated by the content generator 26 to a browser of the corresponding modality. With respect to a browser that was initial content requestor, content is transmitted as a response to an HTTP (HyperText Transfer Protocol) request; with respect to other browsers to be synchronized, instruction is given to acquire corresponding content (i.e., such content is pushed). For example, a content document acquisition request is given in the form of an URL.

The multimodal control method of this first embodiment will be explained with reference to the flowchart shown in FIG. 2.

In Step S10, a processing request from a browser is received by the processing receipt unit 22. As described above, the processing request transmitted from the browser may be any one of the new document acquisition request, interim input results registration request, input focus move request or result data registration request; depending on this processing request, control proceeds to one of Steps S11-14.

Figure 3:
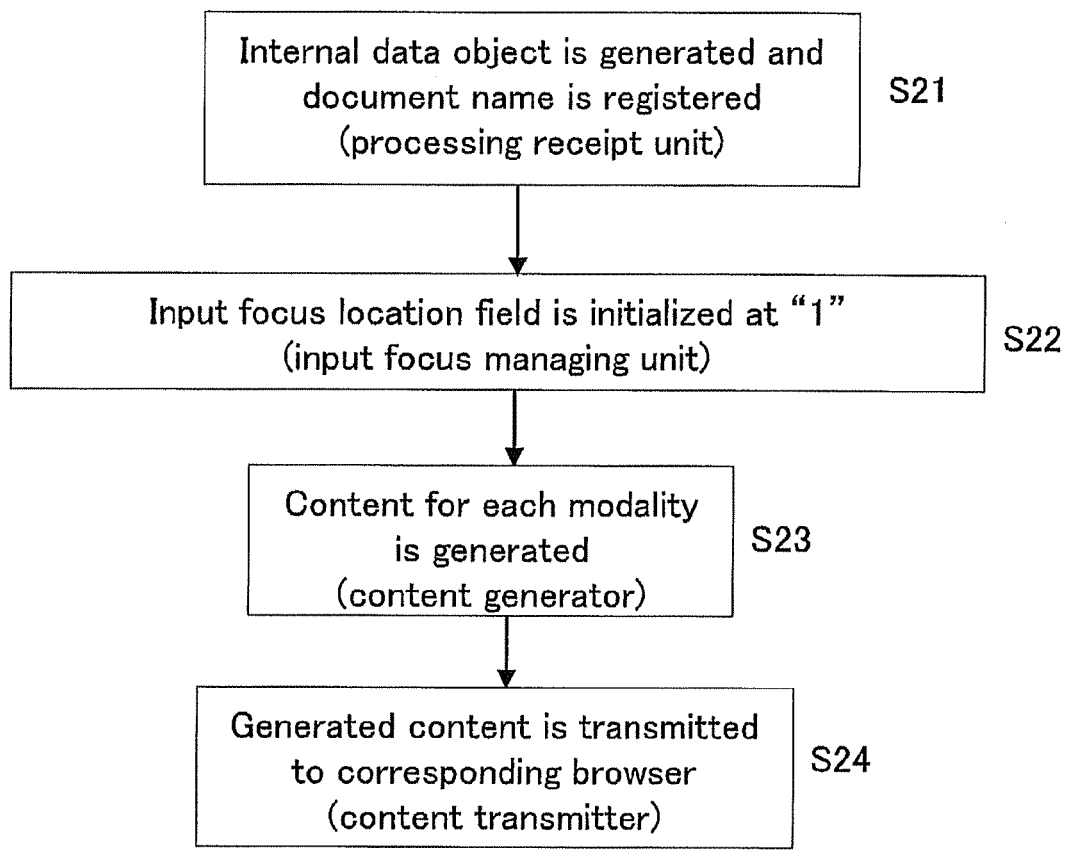
FIG. 3 is a control flowchart of new document acquisition request processing.

When a processing request from the browser is a document acquisition request, control proceeds to Step S11. FIG. 3 illustrates a flowchart of the new document acquisition request processing.

In Step S21, an internal data object is generated based on a processing request received by the processing receipt unit 22, and a document name is registered and stored in the internal data object storage unit 25.

In Step S22, the input focus managing unit 23 sets the input focus location field at the initial value. In this case, settings are made so that from among a plurality of input items contained in a document, the initial input item is selected. Alternatively, settings for a default input order are enabled, and when the default input order is set, from among a plurality of input items contained in a document, input items are selected in correspondence with the default input order.

In Step S23, content for each modality is generated by the content generator 26. Specifically, based on a processing request received by the processing receipt unit 22, the content generator 26 calls up the relevant document from the document database 32 and converts the same into content for each browser. At this time, for content for a GUI browser with browsability, background color may be changed to visually specify the input item set as initial input focus location.

In Step S24, content generated by the content generator 26 is transmitted to the corresponding browser by the content transmitter 27. Specifically, content generated by the content generator 26 is transmitted to the browser requesting processing, and corresponding content is pushed so as to be acquired by the browsers to be synchronized.

FIG. 8 illustrates an example of an internal data object in an initial state.

As shown in FIG. 8, an internal data object is stored as a table in which the field names of document name, input focus, and input data are correlated with the relevant field value.

The document name field contains identification data specifying a document stored in the document database. In the example of FIG. 8, this is the document file name "sheet1.xml." The input focus field contains a number indicating current input order; in the example of FIG. 8, this is a "1" as this is the initial state. The input data field contains data input from each modality to an input item correlated with information identifying the input item. In the example of FIG. 8, because it is an initial state, the field is blank.

FIG. 9 illustrates one example of a document stored in the document database 32.

In the example shown, the document is named "sheet1.xml" and is written in XML (eXtensible Markup Language). FIG. 9 shows an example of facility check items, and the existence of three items, identified by "Is it damaged?," "Is it worn away?," and "Is pump pressure normal?," is described using <item> tags. The three items are data input items included in a document. Also, in the example of FIG. 9, entries to be input in each input item are indicated by the <input> tag. Specifically, for "Is it damaged?" and "Is it worn away?" the entry is to be either "yes" or "no"; when an answer such as "it is" or "yes" is input from a voice modality or the like, an input of "yes" is recognized, and when an answer such as "it isn't" or "no" is input, an input of "no" is recognized. For "Is pump pressure normal?" the entry is to be either "normal" or "abnormal"; when "normal" is input from a voice modality or the like, an input of "normal" is recognized, and when "abnormal" is input, input of "abnormal" is recognized.

In response to a processing receipt received by the processing receipt unit 22, the content generator 26 calls up a document from the document database 32, and for the HTML browser 10, XSL for HTML conversion is applied, and in accordance with conversion rules written in XSL for HTML conversion, initial state HTML content as shown in FIG. 10 is generated from the document data shown in FIG. 9. Because it is desirable that on the HTML browser 10 check items be displayed as a list, HTML content is generated so that all input items are displayed on the HTML browser 10. Here, "description of check" and "results" columns are provided, and in the description of check column, "Is it damaged?" "Is it worn away?" and "Is pump pressure normal?" are acquired from the <label> tags within the <item> tags of the document data of FIG. 9 and written as item names. An item ID for identifying each item is generated and written for each item. In the example of FIG. 10, an item ID comprises "id"+serial number, and the item IDs generated for "Is it damaged?" "Is it worn away?" and "Is pump pressure normal?," are "id1," "id2," and "id3" respectively. Also, for each item name, "yes"/"no" or "normal"/"abnormal" is acquired as input entries to be input based on the <enumeration> tags in <input_type> tags associated with an <input_type> tag of an <item> tag of document data of FIG. 9, and input entries are written and provided as radio buttons. Also, at time of instructing to end input, a "submit" button for transmitting a submission to the Web server side is set. Because the input focus location field managed by the input focus managing unit 23 is for the initial value, the field for the item name "Is it damaged?" has a background color that is different from the background color of other items. In the example of FIG. 10, the first input item, "Is it damaged?," has "#FFFF00" set in the <bgColor> tag in the <tr> tag, so that only the "Is it damaged?" column has yellow as the background color. In this manner, HTML content generated from the document data is transmitted from the content transmitter 27 to the HTML browser 10, and displayed on the user terminal as shown in FIG. 12A.

In response to a processing request received by the processing receipt unit 22, the content generator 26 calls up a document from the document database 32, and for the VoiceXML browser 11, XSL for VoiceXML conversion is applied, thereby generating, in accordance with conversion rules described in XSL for VoiceXML conversion, VoiceXML content in the initial state as shown in FIG. 11 from the document data shown in FIG. 9. For VoiceXML content, content granularity needs to be on the level of individual input item, and because, at start, "1" is set in the input focus location field, VoiceXML content is generated only with respect to the first input item. The example of FIG. 11 will be explained in detail. First, the <prompt> tag in a <block> tag is used to generate a description for causing a voice response system to output a voice announcement, "Start checking." Next, an item ID is generated for identifying that this is the first input item. In the example of FIG. 11, as described above, as item ID comprises "id"+serial number and this is the first input item, an item ID of "id1" is generated. The generated item ID is described in a <name> tag in a <field> tag. A <prompt> tag acquires "Is it damaged?" from the <label> tag of the first <item> tag in the document data of FIG. 9, and generates a description for causing output of a voice asking, "Is it damaged?" In the <grammar> tag, generated identification data is set in the <grammar root> tag and <rule id> tag, and <rule> is written based on the description of input_type name="type1" associated with "Is it damaged?" in the document data of FIG. 9.

As a result, VoiceXML content is generated defining that when in response to the voice output of the question "Is it damaged?" there is voice input of "it is," or "yes" it is determined that "yes" has been input in the relevant input item, and when there is a voice input of "it isn't" or "no," it is determined that "no" has been input in the relevant input item. Such VoiceXML content is transmitted from the content transmitter 27 to VoiceXML browser 11, so that a dialogue as shown in FIG. 12B takes place on the user terminal (here, an example is shown where in response to the question "Is it damaged?" "no" is voice input).

Figure 2:
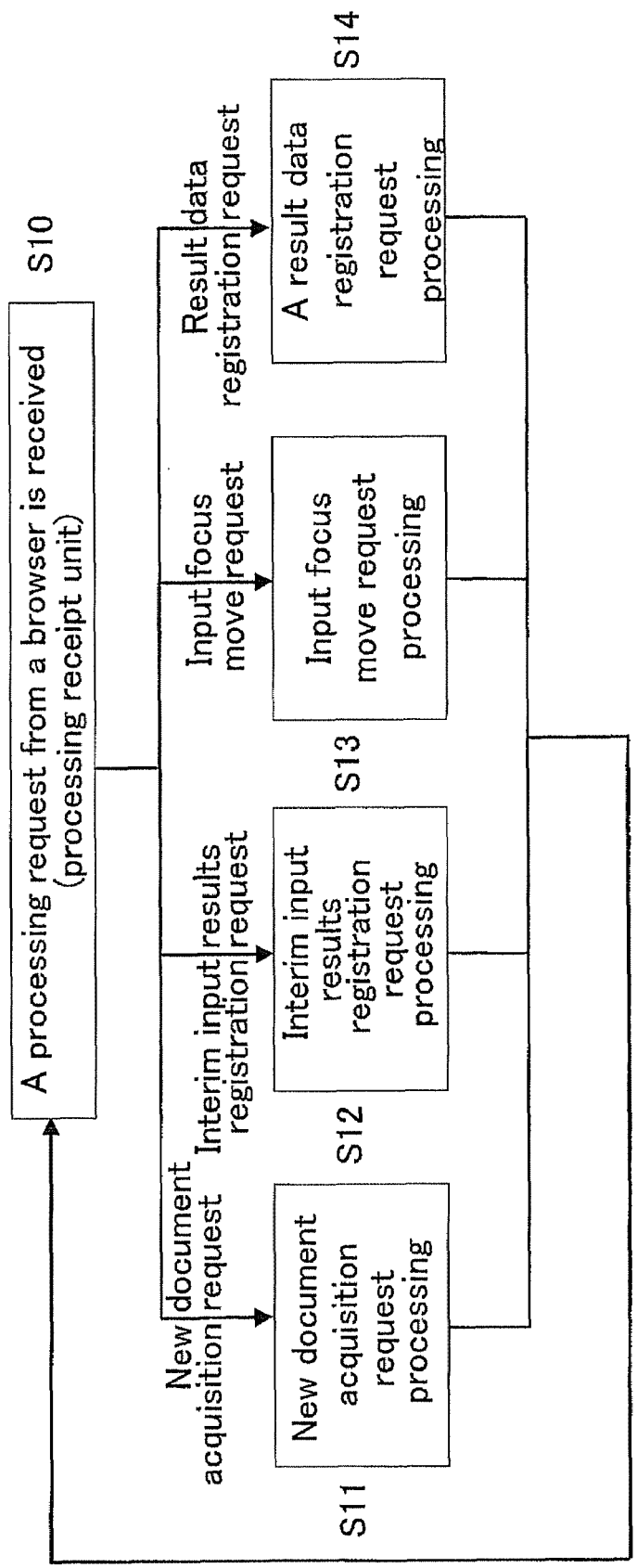
FIG. 2 is a control flowchart showing the operations thereof.
Figure 4:
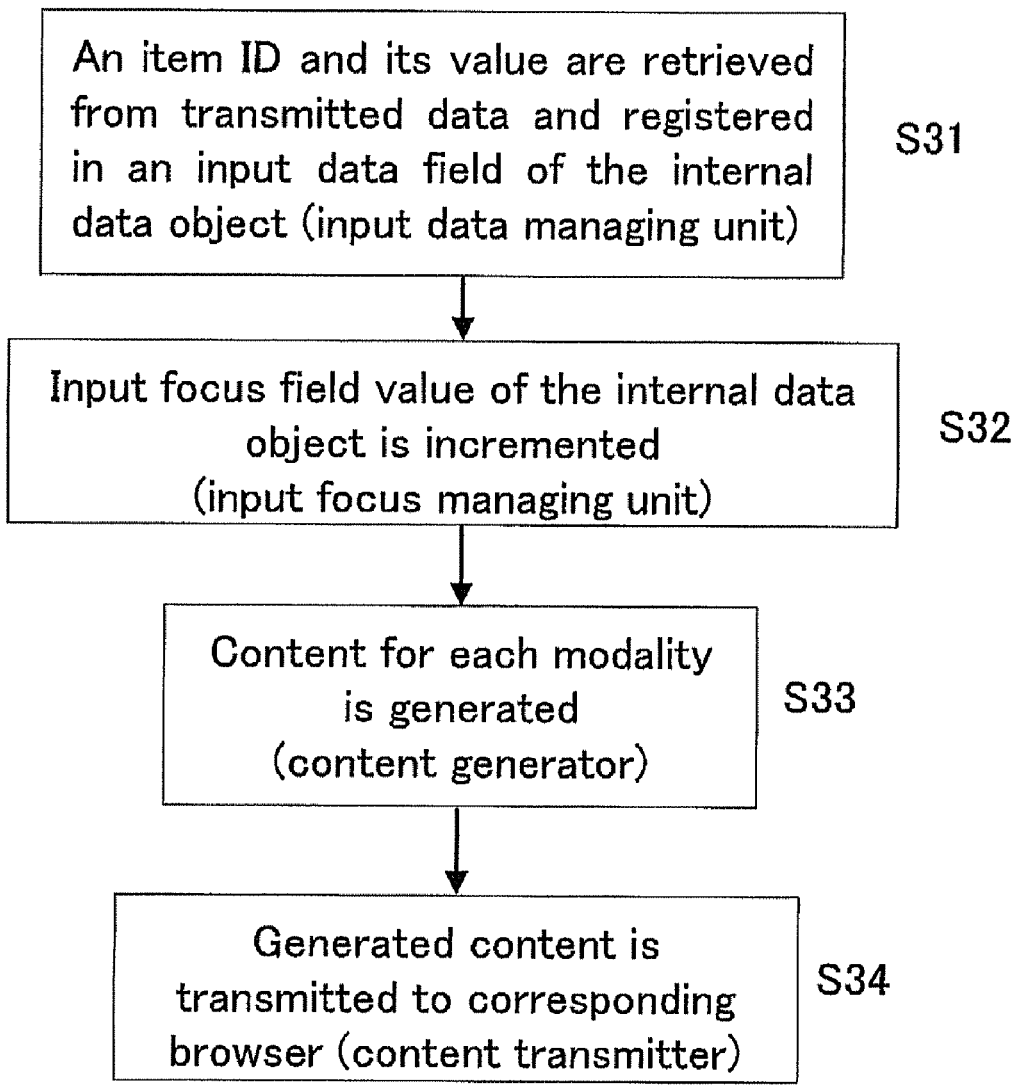
FIG. 4 is a control flowchart of interim input results registration request processing.

In the flowchart of FIG. 2, when a processing request from a browser is an interim input results registration request, control proceeds to Step S12. FIG. 4 illustrates a flowchart of the processing of an interim input results registration request.

In Step S31, based on a processing request received by the processing receipt unit 22, the input data managing unit 24 retrieves an item ID and its value, and registers the item ID and its value in the input data field of the internal data object. For example, let us consider a case where with respect to the VoiceXML browser 11, content as shown in FIG. 11 is generated, a dialogue as shown in FIG. 12B takes place, and the results thereof are reflected in the HTML browser 11. In this case, the input data for item ID "id1" for "Is it damaged?" is "no," and request to register such interim input results is transmitted from the VoiceXML browser 11. Based on such interim input results registration request, the input data managing unit 24 updates the internal data object storage unit 25 and, as shown in FIG. 13, makes the value of the input data item of the internal data object "id1=no".

In Step S32, the input focus managing unit 23 increments the input focus field value of the internal data object. As a result, the focus location of the internal data object becomes "2" as shown in FIG. 13.

In Step S33, the content generator 26 generates content for each modality. Here, content is generated reflecting input data from the interim input results registration request. For example, FIG. 14 shows content for the HTML browser 10 reflecting the internal data object of FIG. 13. Here, a <checked> tag indicates that the data "no" has been input for input item "id1", and based on the focus location field value, the background color of the second input item "id2" "Is it worn away?" has been changed.

Also, as content for the VoiceXML browser 11, the content generator 26 generates the VoiceXML content "Is it worn away?" (id2), which is the next input item as shown in FIG.

15. The content for this input item "id2", as with the content for the input item "id1" (FIG. 11), is described with finer content granularity.

In Step S34, the content transmitter 27 transmits content for each browser. As a result, in the above example, for the HTML browser 10, as shown in FIG. 16A, content is transmitted in which data has been input in the input item "Is it damaged?" and the background color of the second input item has been changed. For the VoiceXML browser 11, a voice output of "Is it worn away?" is made and a response thereto is voice input, resulting in the dialogue shown in FIG. 16B.

Figure 5:
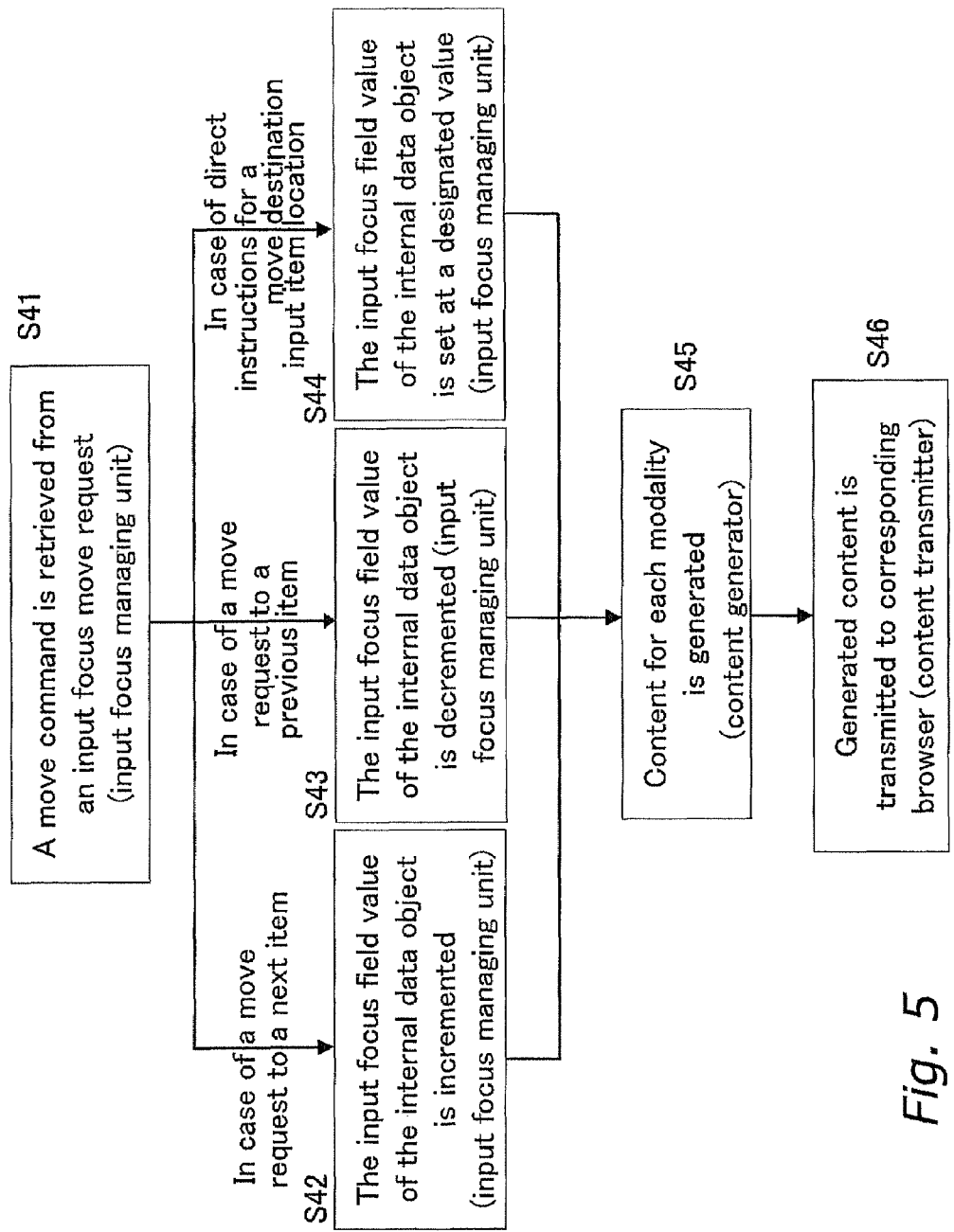
FIG. 5 is a control flowchart of input focus move request processing.

In the flowchart of FIG. 2, when a processing request from a browser is a request for input focus location move, control proceeds to Step S13. In Step S13, the focus location managing unit 23 processes a focus location move request. FIG. 5 illustrates a flowchart of the focus location move request processing.

In Step S41, the input focus managing unit 23 retrieves a move command from a processing request received by the processing receipt unit 22. For the HTML browser 10, a button for moving input focus can be generated in the content, and when this is clicked on using a mouse or other pointing device, an input focus location move request is generated. Alternatively, when an input item location in content displayed on a user terminal is directly clicked on by a mouse or other pointing device, a focus location move request is generated. The VoiceXML browser 11 may be configured so that when a voice instructing moving focus location such as "up" "down" "right" and "left" or when a voice directly specifying input item is recognized, a focus location move request corresponding to these instructions is generated.

When the input focus managing unit 23 has determined that the input focus location move command is a request to move to the next item, control proceeds to Step S42.

In Step S42, the input focus managing unit 23 increments the value in the input focus location field of the internal data object.

When the input focus managing unit 23 determines that the input focus location move command is a request to move to the previous item, control proceeds to Step S43.

In Step S43, the input focus managing unit 23 decrements the value in the input focus location field of the internal data object.

When the input focus managing unit 23 has determined that the input focus location move command is a move request directly specifying input item location, control proceeds to Step S44.

In Step S44, the input focus managing unit 23 sets the value for the input focus location field of the internal data object at the specified value.

In Step S45, the content generator 26 generates content for each modality. As with the configuration above, for the HTML browser 10, content is generated for which browsability is maintained and the background color of the current input item (input focus location) has been changed, and for the VoiceXML browser 11, content granularity has been made finer to generate content for each input item.

In Step S46, the content transmitter 27 transmits generated content to the corresponding browser.

Figure 6:
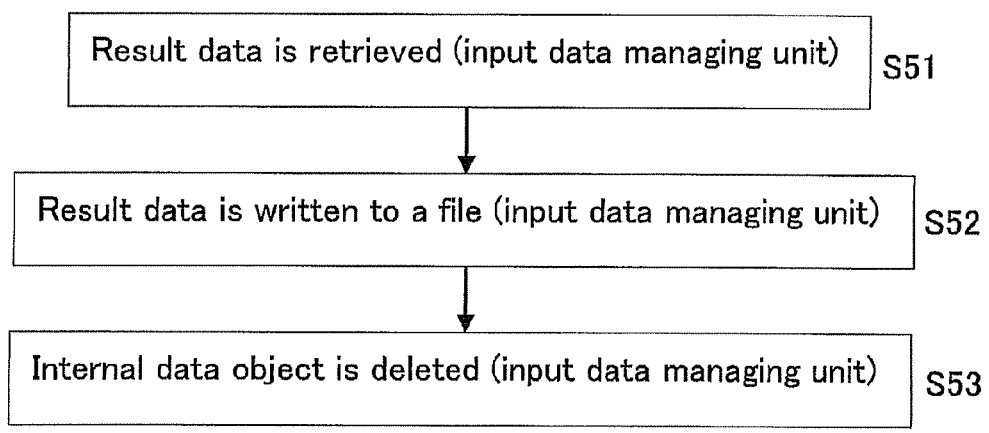
FIG. 6 is a control flowchart of result data registration request processing.

In the flowchart of FIG. 2, when a processing request from a browser is for result data registration request processing, control proceeds to Step S14. Here, the input data managing unit 24 processes the result data registration request. FIG. 6 illustrates a flowchart of the result data registration request processing.

In Step S51, the input data managing unit 24 retrieves the result data from the processing request received by the processing receipt unit 22.

In Step S52, the input data managing unit 24 writes the result data retrieved from the processing request to the result data file 31 and other databases.

In Step S53, the input data managing unit 24 deletes the internal data object.

For example, in a case where, in the VoiceXML browser 11, dialogue has been carried out as shown in FIGS. 12B and 16B, and "normal" has been input for item "id3," the internal data object is in a state as shown in FIG. 17, i.e., the focus location field is at the value following the value indicating "id3" which is the final input item, and input data for each input item has been registered. Thus in the HTML content, as shown in FIG. 18, "checked" has been inserted in INPUT attributes for each input item. The VoiceXML content makes voice output of "Do you want to submit check results to the center?" to prompt a user to make a result data registration request, and generates content as shown in FIG. 19 for awaiting a response. In this manner, in the HTML browser 10, as shown in FIG. 20A, input results are displayed and a screen for awaiting Submit input is displayed; in the VoiceXML browser 11, dialogue as shown in FIG. 20B is executed.

When the Submit button of the HTML browser 10 is operated, or when a user responds "yes" to the voice output of "Do you want to submit check results to the center?" of the VoiceXML browser 11, a result data registration request is processed. FIG. 21 illustrates an example of the result data file output based on this result data registration request processing.

Figure 7A:
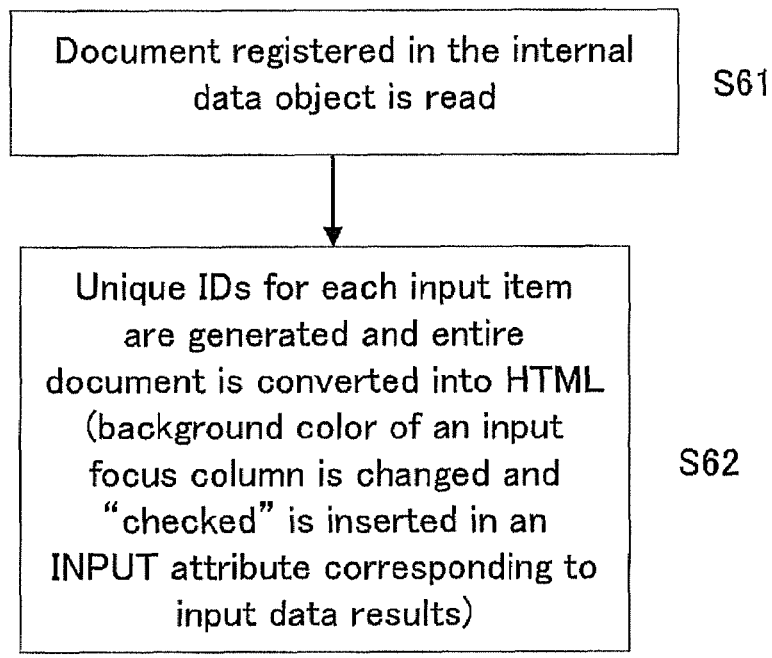
FIG. 7A is a control flowchart of content generation process.
Figure 7B:
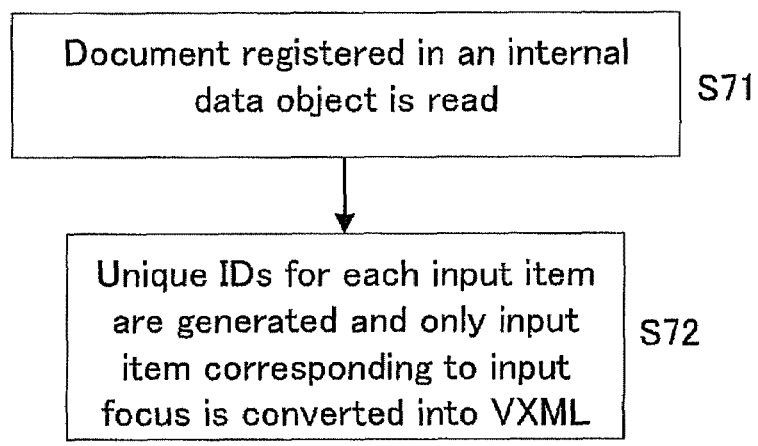
FIG. 7B is a control flowchart of content generation process.

In each of the above steps, an internal data object stored in the internal data object storage unit 25 is converted into content for each browser by the content generator 26 and transmitted via the content transmitter 27. Content generation for each browser will be explained based on the flowcharts of FIG. 7, with FIG. 7A illustrating content generation steps for the HTML browser 10, and FIG. 7B illustrating content generation steps for the VoiceXML browser 11.

In Step S61, the content generator 26 reads the document registered in the internal data object.

In Step S62, the content generator 26 generates an item ID unique to each input item and converts the entire document into HTML content. At this point, based on the input focus location managed by the input focus managing unit 23, the background color of the current input item is changed and "checked" is inserted in the INPUT attribute for the input item corresponding to the input data result, thereby specifying the current input item and displaying already input result data on the browser.

In Step S71, the content generator 26 reads the document registered in the internal data object.

In Step S72, the content generator 26 generates an item ID unique to each input item and converts only the input item that is the subject of input focus into VoiceXML content. As a result, content to be transmitted to the VoiceXML browser 11 is given finer granularity, enabling reproduction of content having browser-appropriate granularity.

This first embodiment describes a case of voice-led operation with results of voice input being output on a screen. This is because an ordinary VoiceXML browser does not comprise an input interface for receiving push of content reflecting interim input results. In contrast, in the case of a Web browser, by using a Java applet (Java is a registered trademark), JavaScript (Java is a registered trademark) or other plug-in capabilities, an input interface for receiving a push can be easily achieved. When such an interface is loaded on a VoiceXML browser, input results on a Web browser can be directly reflected on the voice side, enabling synchronization of the VoiceXML browser with Web browser-led operation. In this case, because a mechanism is required for notifying the multimodal controller of interim input results in the Web browser, a Java applet (Java is a registered trademark) or JavaScript (Java is a registered trademark) must be included in the content.

Also, in FIG. 3, the processing receipt unit 22 registers a document name in the internal data object, and the content generator 26 reads the document every time. Alternatively, the processing receipt unit 22 may read a document and register the read memory address in the internal data object, and the content generator 26 reads the appropriate memory.

Also, the above embodiment is configured so that, at time of conversion from document data into content for each modality, an item ID unique to each input item of document data is automatically generated. Alternatively, an item ID may be set in advance for each input item in document data.

Also, in the Action attribute for Form in HTML content (FIGS. 10, 14 and 18) to be converted, /result, which is the URI for receiving a result data registration request, is set as submission destination; in the case of VoiceXML content (FIGS. 11 and 15), /report, which is the URI for receiving interim input results, is set. Also, in the case of VoiceXML content (FIG. 19) asking whether to make server submission of the final results, in addition to /result, which is the URI for receiving a result data registration request, input data input up to that point in time is set as an HTTP query character string.

Second Embodiment

Figure 22:
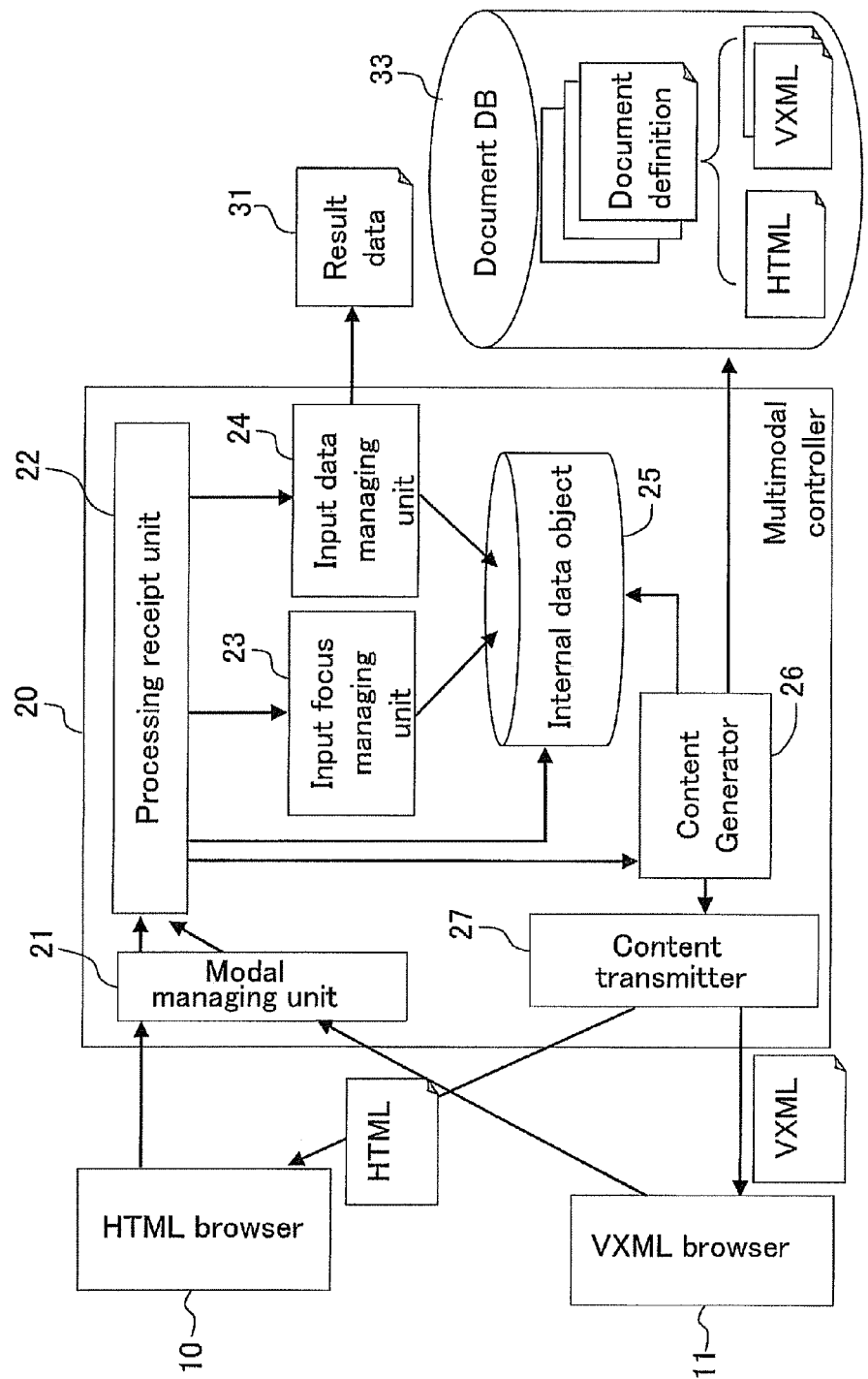
FIG. 22 is a functional block diagram showing a schematic configuration of the second embodiment.

FIG. 22 illustrates the overall configuration of a multimodal control device relating to a second embodiment of the present invention.

This multimodal control device of the second embodiment, as with the first embodiment, comprises a browser for each modal such as, for example, the HTML browser 10 and VoiceXML browser 11, a multimodal controller 20 and a document database 33.

In the second embodiment there are also two browsers, the HTML browser 10 and VoiceXML browser 11.

The configuration of the multimodal controller 20 is virtually the same as that of the first embodiment, and explanation thereof will be omitted here.

In the first embodiment, content is dynamically converted from a document written in XML in accordance with input focus; in contrast, in the second embodiment, HTML content and further granulated VoiceXML content are respectively prepared in advance as JSP (Java Server Pages), and content is generated from the relevant JSP in accordance with input focus and transmitted to a browser.

The relationship between a JSP for HTML and further granulated JSP files for VoiceXML is defined by a document definition file (XML file) in the document database 33 (FIG. 24). The examples of FIG. 24 show that the HTML JSP and VoiceXML JSP for input item id1 are HTML1.jsp and VoiceXML 1.jsp respectively.

FIGS. 25A-25B illustrates an example of HTML1.jsp. FIG. 11 illustrates an example of VoiceXML1.jsp. FIGS. 25A-25B shows a Java program for reflecting in the HTML content the input focus and interim input results in the internal data object.

In FIG. 24, the JSP relationships for id2 and id3, and for submit confirmation content for final submission of input results for input items are defined. FIG. 19 shows an example of the VoiceXML 4.jsp in FIG. 24.

The flowchart of the multimodal controller in the second embodiment is virtually the same as that of the first embodiment. However, in the first embodiment, a document name was registered in the internal data object and read by the content generator 26 for content conversion; in the second embodiment, the content generator 26 reads the document definition file name registered in the internal data object, extracts the relevant JSP file name in accordance with the definition, and requests processing of the JSP, thereby generating and transmitting content to each browser. FIG. 23 illustrates an example of an internal data object of the second embodiment.

Figure 26A:
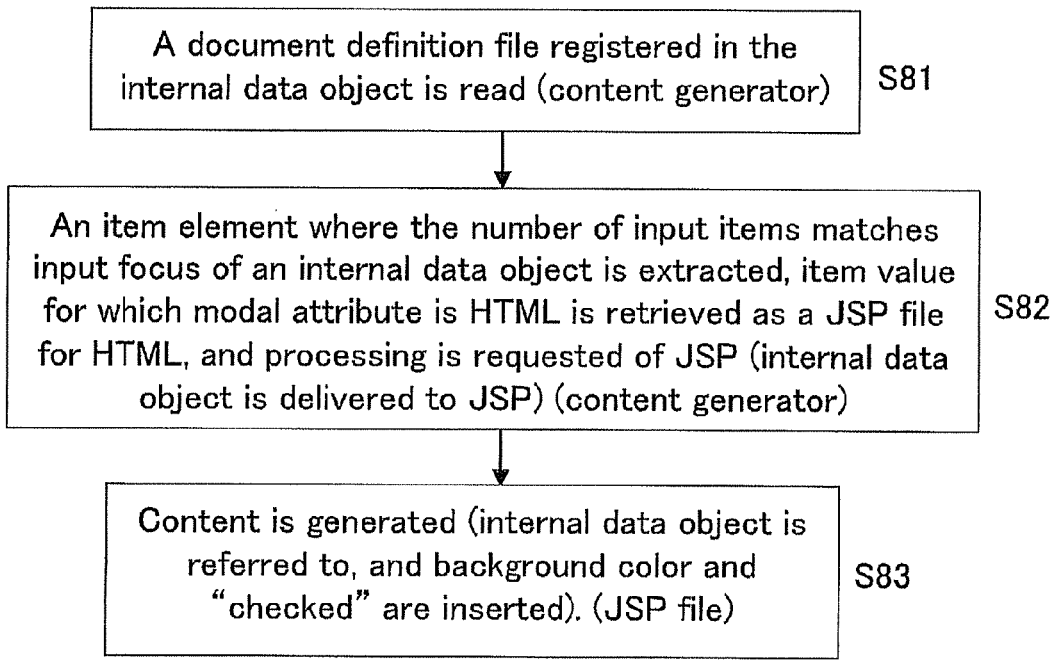
FIG. 26A is a control flowchart of a content generation process.
Figure 26B:
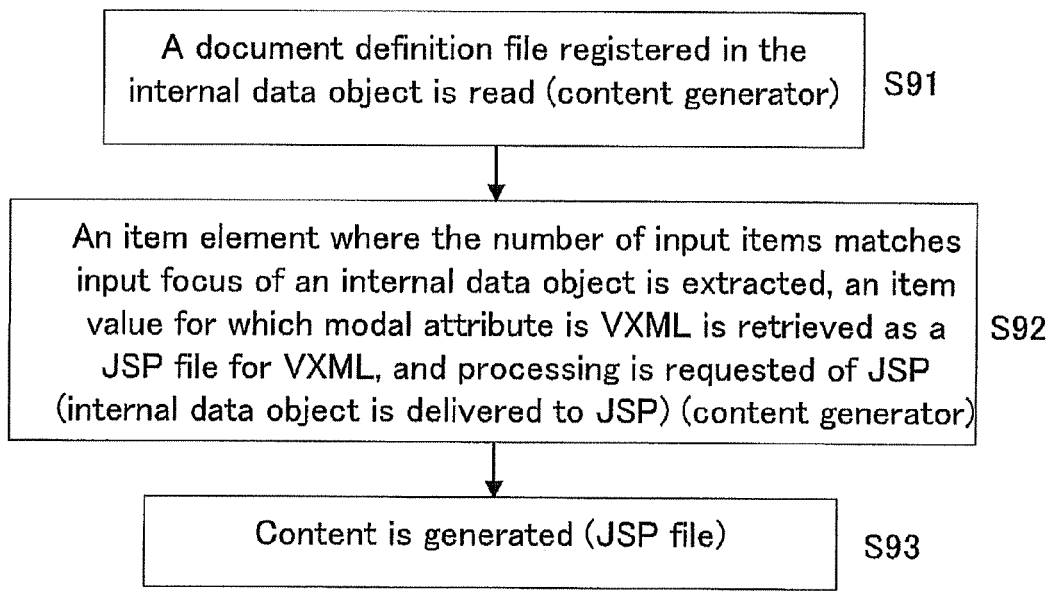
FIG. 26B is a control flowchart of a content generation process.

FIG. 26 illustrates processing flow of the content generator 26. Specifically, FIG. 26A illustrates steps for content generation for the HTML browser 10, and FIG. 26B illustrates steps for content generation for the VoiceXML browser 11.

In Step S81, the content generator 26 reads the document definition file registered in the internal data object.

In Step S82, the content generator 26 extracts an item element in which the number of input items matches the input focus of the internal data object, retrieves the value of an item having HTML as a modal attribute in the form of a JSP file for HTML, and requests a JSP to process (i.e., internal data object is delivered to the JSP).

In Step S83, the JSP refers to the internal data object, inserts a background color in a current input focus location and inserts "checked" as an INPUT attribute for an already input item, and generates HTML content.

In Step S91, the content generator 26 reads the document definition file registered in the internal data object.

In Step S92, the content generator 26 extracts an item element having an input item number that matches input focus of an internal data object, retrieves the value of an item having VXML as a modal attribute in the form of a JSP file for VoiceXML, and requests a JSP to process (i.e., internal data object is delivered to the JSP).

In Step S93, the JSP refers to the internal data object to generate VoiceXML content corresponding to current input focus location.

Third Embodiment

Figure 27:
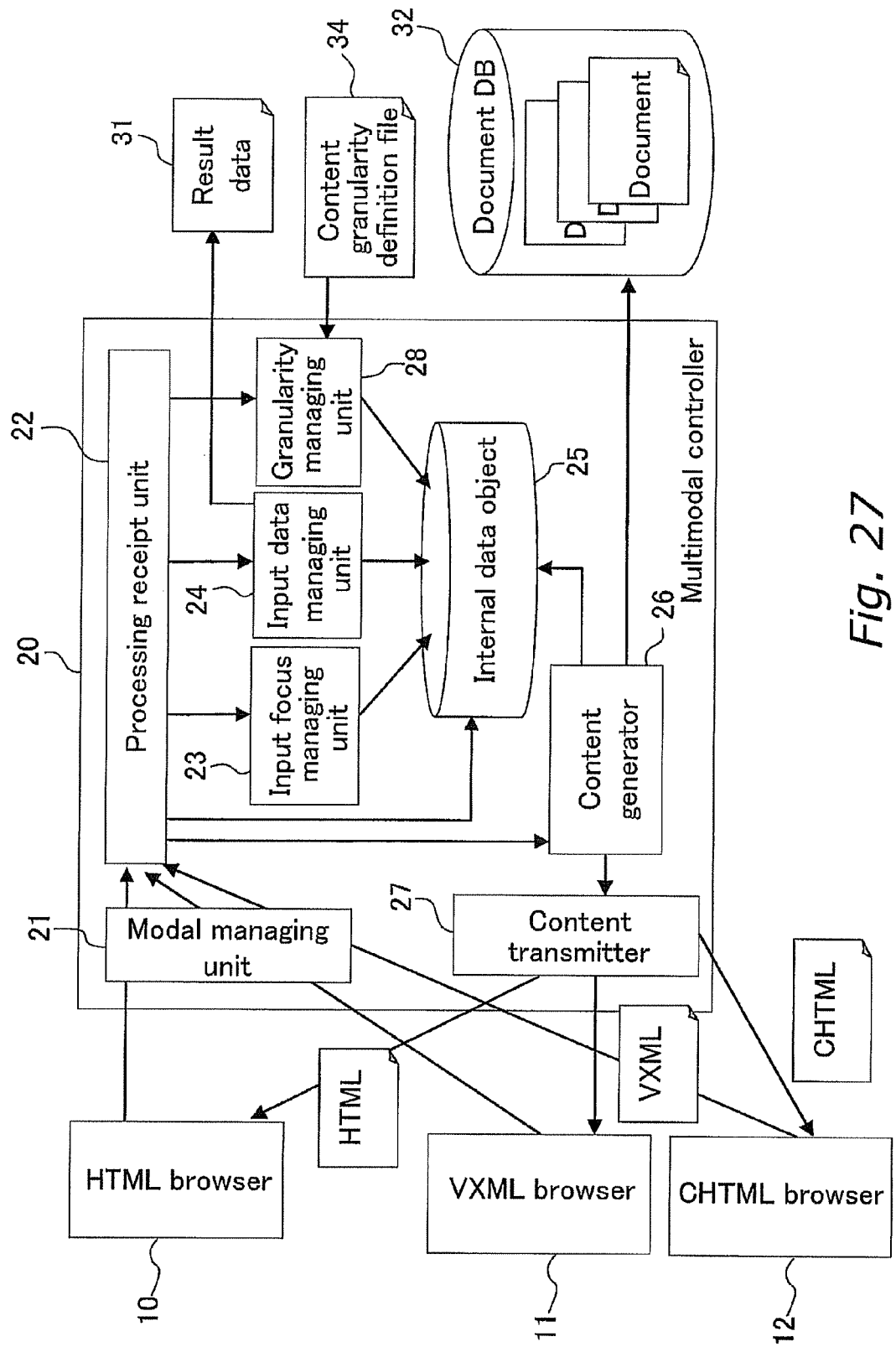
FIG. 27 is a functional block diagram showing a schematic configuration of the third embodiment.

FIG. 27 illustrates the overall configuration of a multimodal control device relating to a third embodiment of the present invention.

In this third embodiment, rather than a choice between content granulated at the level of individual input item or content including all items, generation of content having an intermediate granularity is allowed.

In addition to the configuration in the first and second embodiments, the multimodal controller 20 also comprises a granularity managing unit 28 for managing content granularity. The granularity managing unit 28 manages granularity for content generated for each modality, and may be configured so that the range of content input items to be generated in an internal data object is set based on a content granularity definition file 34 in which granularity is defined for each modality. FIG. 34 illustrates one example of this content granularity definition file 34. The content generator 26, based on the input item range set by the granularity managing unit 28 based on the content granularity definition file 34, generates content for each modality, thereby enabling appropriate granulation and display, for example, of document data prepared for a large screen, for a modality (CHTML) with restricted screen size such as a cell phone. Explanation will now be given of a constitution comprising a CHTML browser 12 as a browser with differing granularity.

Figure 28:
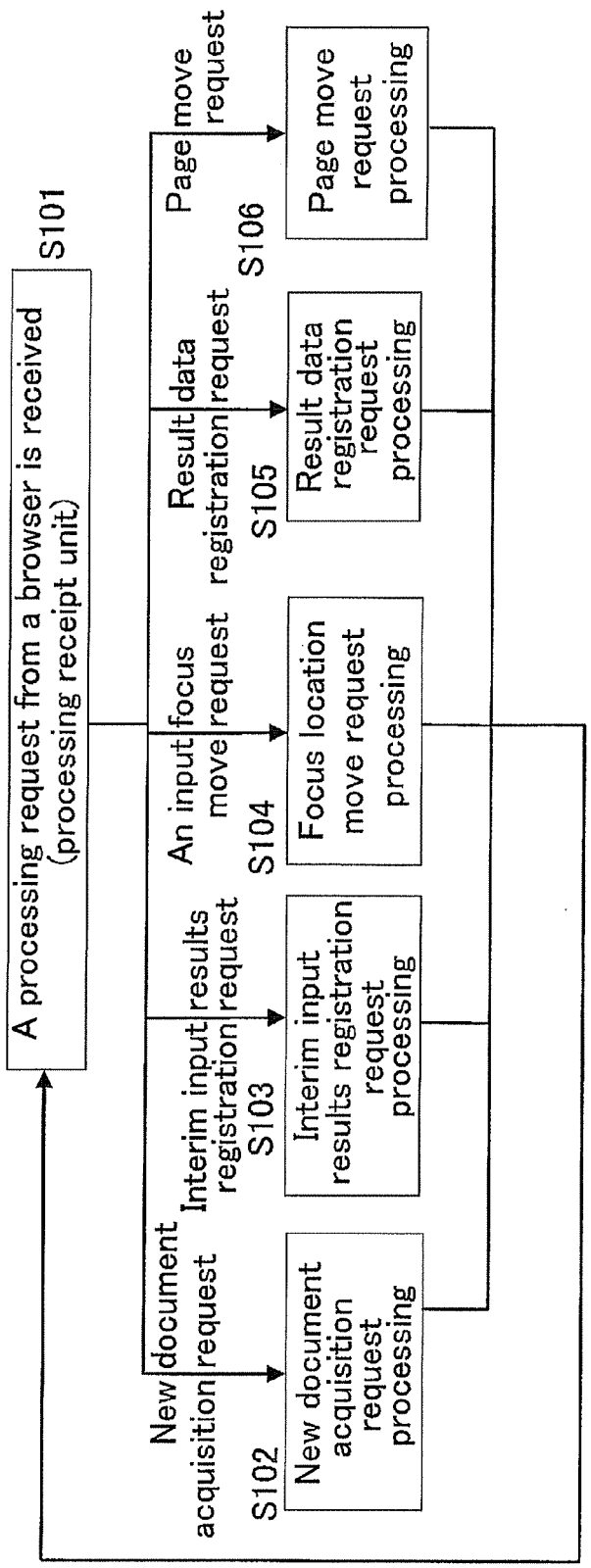
FIG. 28 is a control flowchart showing the operation thereof.

FIG. 28 illustrates a flowchart of multimodal control processing of the third embodiment.

In Step S101, the processing receipt unit 22 receives a processing request from a browser. Here, processing requests transmitted from a browser include, in addition to a new document acquisition request, interim input results registration request, input focus move request and result data registration request, a page move request; depending on the processing request, control proceeds to one of Steps S102-S106.

Figure 29:
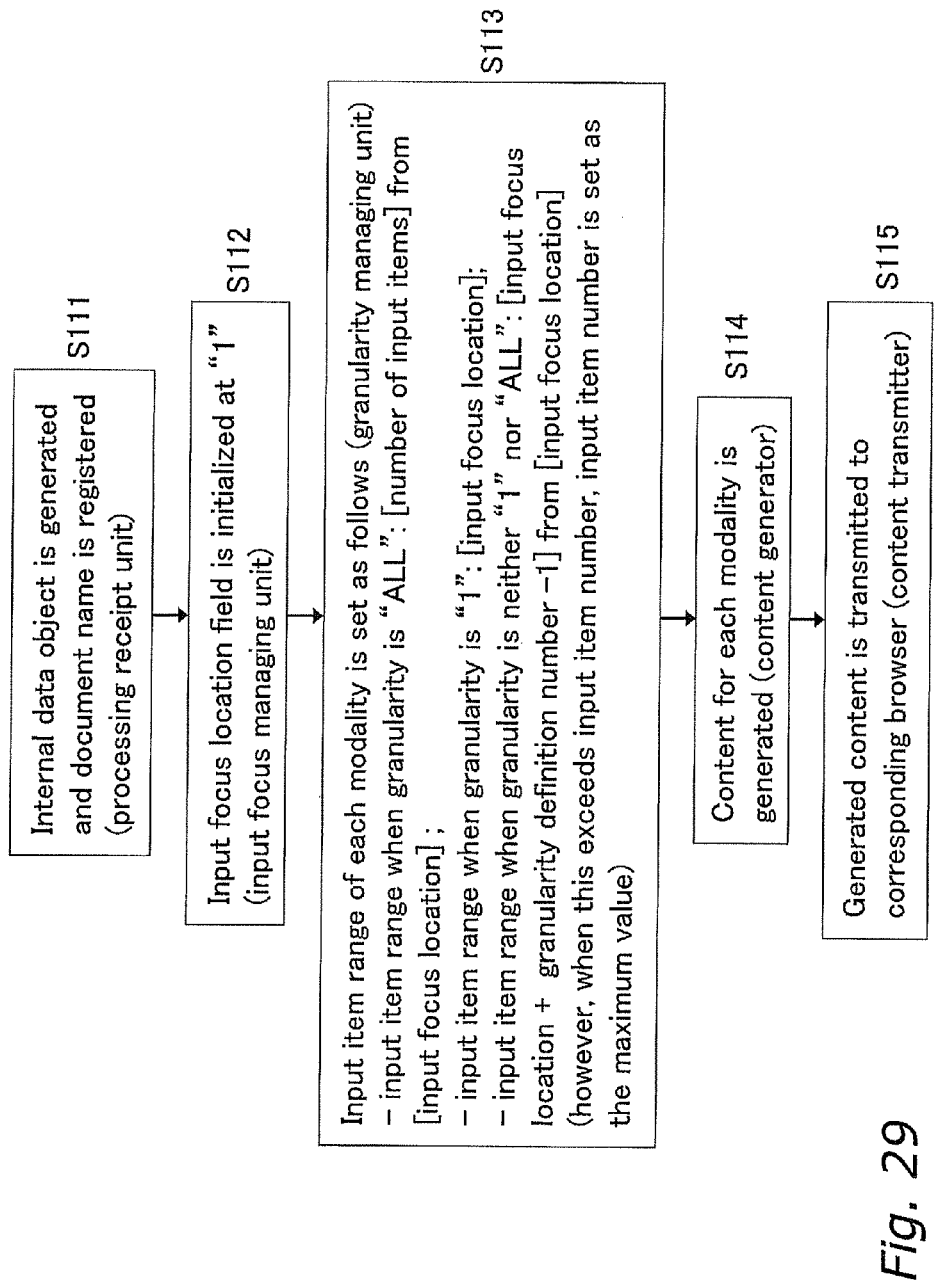
FIG. 29 is a control flowchart of a new document acquisition request processing.

When a processing request from a browser is a document acquisition request, control proceeds to Step S102. In Step S102, the processing receipt unit 22 processes the new document acquisition request. FIG. 29 illustrates a flowchart of the new document acquisition request processing.

In Step S111, an internal data object is generated based on a processing request received by the processing receipt unit 22, and a document name is registered and stored in the internal data object storage unit 25.

In Step S112, the input focus managing unit 23 sets the input focus location field as the initial value.

In Step S113, based on the content granularity definition file 34, the granularity managing unit 28 sets the input item range for each modality as follows:

(1) input item range when granularity is "ALL": [number of input items] from [input focus location];

(2) input item range when granularity is "1": [input focus location]; and (3) input item range when granularity is neither "ALL" nor "1": [input focus location+granularity definition number −1] from [input focus location] (however, when this exceeds the number of input items, the number of input items is set as the maximum value)

In Step S114, using the content granularity for each modality set by the granularity managing unit 34, the content generator 26 generates content for each modality. Here, as in the first embodiment, based on the processing request received by the processing receipt unit 22, the content generator 26 calls up the appropriate document from the document database 32, and converts the same into content for each browser.

In Step S115, content generated by the content generator 26 is transmitted to the corresponding browsers by the content transmitter 27. Here, content generated by the content generator 26 is transmitted to the browser from which a processing request was made, and corresponding content is pushed so as to be acquired by the browser to be synchronized thereto. In the case of content for a GUI browser with browsability, background color may be changed to visually specify an input item set as the initial input focus location.

Figure 30:
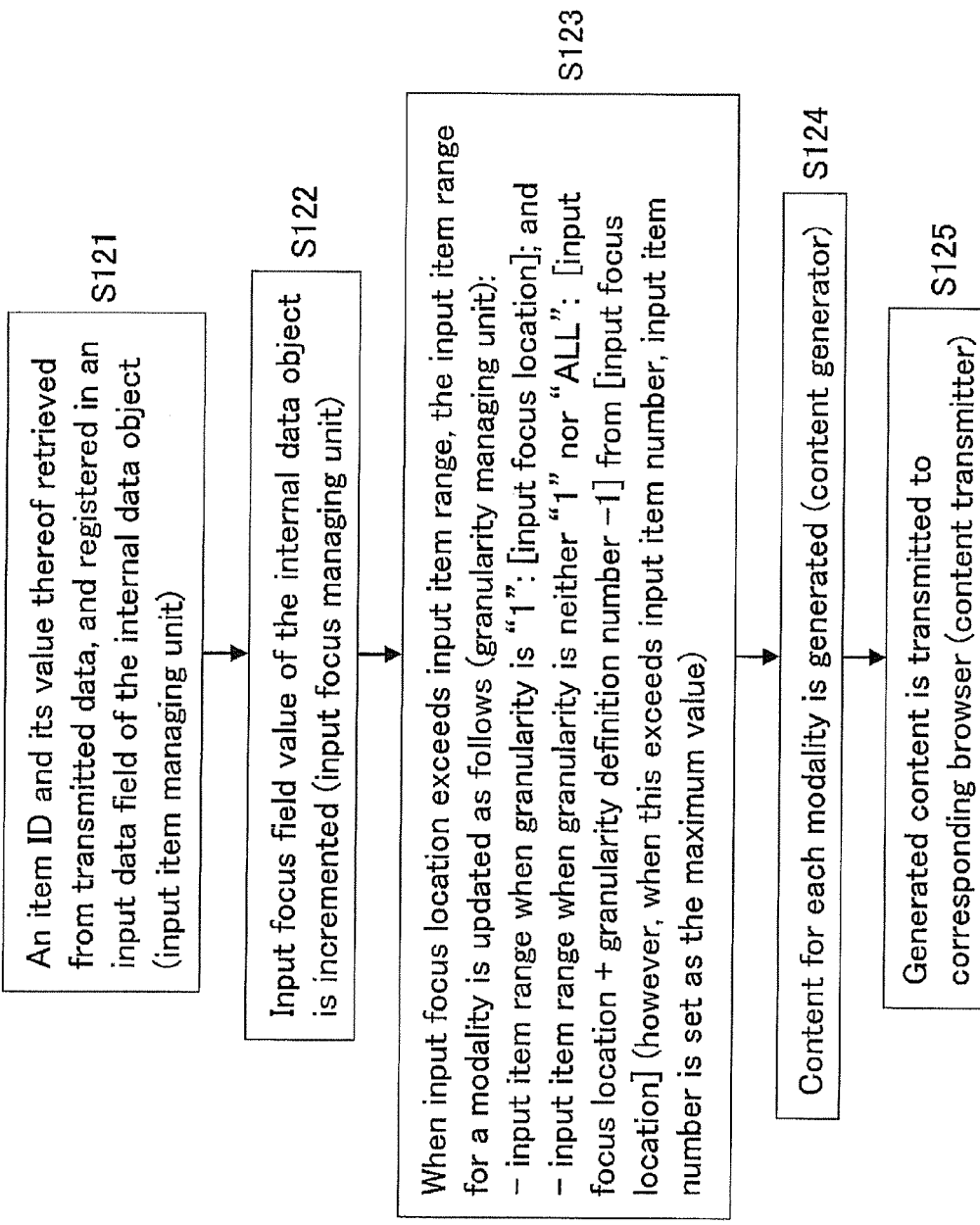
FIG. 30 is a control flowchart of an interim input results registration request processing.

In the flowchart of FIG. 28, when a processing request from a browser is an interim input results registration request, control proceeds to Step S103. In Step S103, the interim input result request is processed. FIG. 30 illustrates a flowchart of interim input results registration request processing.

In Step S121, based on a processing request received by the processing receipt unit 22, the input data managing unit 24 retrieves an item ID and its value, and registers the item ID and its value in the internal data object input data field.

In Step S122, the input focus managing unit 23 increments the value of the internal data object input focus field.

In Step S123, the granularity managing unit 28 updates as follows the input item range of a modality when an input focus location exceeds an input item range:

(1) input item range when granularity is "1": [input focus location]; and (2) input item range when granularity is neither "ALL" nor "1": [input focus location+granularity definition number −1] from ([input focus location] (however, when this exceeds the number of input items, the number of input items is set as the maximum value)

In Step S124, the content generator 26 generates content for each modality. Here content is generated reflecting input data from the interim input results registration request.

In Step S125, the content transmitter 27 transmits content for each browser.

Figure 31:
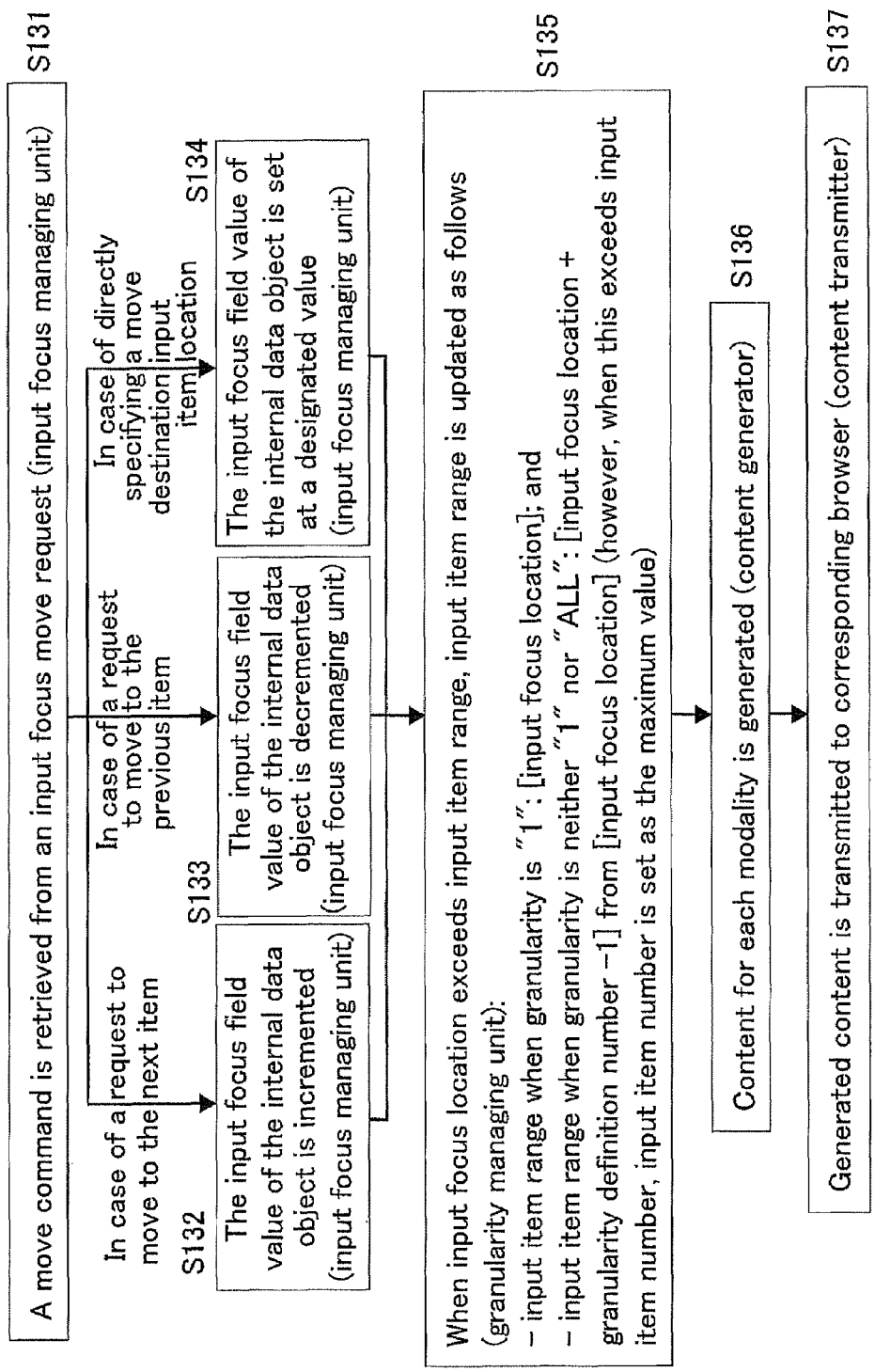
FIG. 31 is a control flowchart of an input focus move request processing.

In the flowchart of FIG. 28, when a processing request from a browser is for input focus location move request processing, control proceeds to Step S104. In Step S104, the focus location managing unit 23 processes the focus location move request. FIG. 31 shows a flowchart for focus location move request processing.

In Step S131, the input focus managing unit 23 retrieves a move command from a processing request received by the processing receipt unit 22. As in the above embodiments, in the case of the HTML browser 10, a button is generated in the content for moving input focus, and when this is clicked on by a mouse or other pointing device, an input focus location move request is generated. In an alternative configuration, when an input item location in content displayed on a user terminal is directly clicked on by a mouse or other pointing device, a focus location move request is generated. In the case of the VoiceXML browser 11, when a voice instructing focus location movement such as "up," "down," "right" and "left" is recognized, or when a voice directly specifying an input item is recognized, a focus location move request corresponding to such instructions is generated.

When the input focus managing unit 23 has determined that a move command for input focus location is a request to move to the next item, control proceeds to Step S132.

In Step S132, the input focus managing unit 23 increments the value of the input focus location field of the internal data object.

When the input focus managing unit 23 determines that a move command for input focus location is a request to move to the previous item, control proceeds to Step S133.

In Step S133, the input focus managing unit 23 decrements the value of the input focus location field of the internal data object.

When the input focus managing unit 23 has determined that a move command for input focus location is a move request directly specifying input item location, control proceeds to Step S134.

In Step S134, the input focus managing unit 23 sets the input focus location field value of the internal data object at a designated value.

In Step S135, input item range is updated as follows with respect to a modality for which input focus location exceeds input item range:

(1) input item range when granularity is "1": [input focus location]; and (2) input item range when granularity is neither "ALL" nor "1": [input focus location+granularity definition number −1] from [input focus location] (however, when this exceeds the number of input items, the number of input items is set as the maximum value)

In Step S136, the content generator 26 generates content for each modality. As with the above, for the HTML browser 10, content is generated with browsability maintained as is and with the background color of the current input item (input focus location), and for the VoiceXML browser 11, content is made more finely granulated and is generated for each input item.

In Step S137, the content transmitter 27 transmits generated content to the corresponding browser.

In the flowchart of FIG. 30, when a processing request from a browser is for result data registration request processing, control proceeds to Step S105. Here, the input data managing unit 24 processes the result data registration request. The result data registration request processing here is identical to that of FIG. 6 of the first embodiment, and explanation thereof is omitted.

Figure 32:
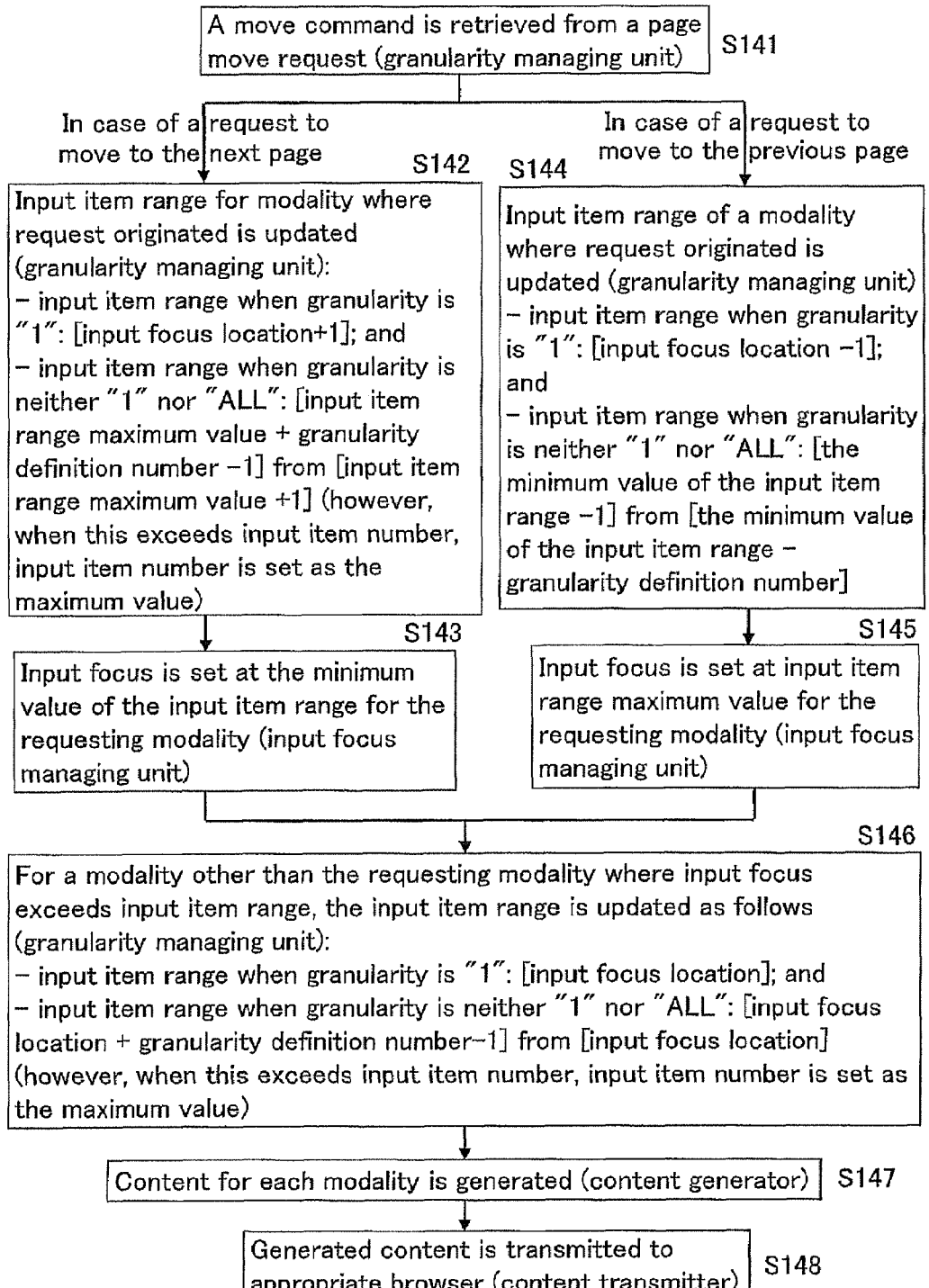
FIG. 32 is a control flowchart of a page move request processing.

In the flowchart of FIG. 30, when determination is made that a processing request from a browser is a page move request, control proceeds to Step S106. In Step S106, the page move request is processed; details will be explained with reference to the flowchart of FIG. 32.

In Step S141, the granularity managing unit 28 retrieves a move command relating to page movement from a processing request received by the processing receipt unit 22. In the case of a modality where granularity with respect to a document is neither "1" nor "ALL," a document is divided into a plurality of pages containing an input item and content then displayed. Therefore, content displayed on the browser can comprise a button for moving to the next page and a button for moving to the previous page, and clicking on these buttons with a mouse or other pointing device generates a page move request. For example, when content written in CHTML (Compact HTML), which is a markup language for creating a Web page for viewing on a cell phone, PDA or other handheld terminal, because the display screen is small, a document needs to be divided into a plurality of pages to be displayed. In a conceivable configuration in such a case, for example, as shown in FIG. 35, there are provided a "next" button for specifying the next page and a "back" button for specifying the previous page, and when these buttons are operated, a page move request is generated.

When the granularity managing unit 28 has determined that a move command is a request to move to the next page, control proceeds to Step S142.

In Step S142, the granularity managing unit 28 updates input item range for the modality from which the page move request originated. Here too, the following rules are applied:

(1) input item range when granularity is "1": [input focus location+1]; and (2) input item range when granularity is neither "1" nor "ALL": [input item range maximum value+granularity definition number −1] from [input item range maximum value +1] (however, when this exceeds number of input items, number of input items is set as the maximum value)

In Step S143, the input focus managing unit 23 sets input focus location at the minimum value for input item range for the modality where the page move request originated. If input focus location is not changed in accordance with page movement, there could be cases where in the modality where the page move request originated, an input item that is a current input focus location is not displayed, but simultaneously changing input focus location in this way facilitates input on a new page.

In Step S141, when the granularity managing unit 28 has determined that a page move request is a request to move to the previous page, control proceeds to Step S1144.

In Step S144, the granularity managing unit 28 updates input item range for the modality where the page move request originated. Here, the following rules are applied:

(1) input item range when granularity is "1": [input focus location-1]; and (2) input item range when granularity is neither "1" nor "ALL": [the minimum value of the input item range −1] from [input item range minimum value−granularity definition number]

In Step S145, the input focus managing unit 23 sets input focus location at the maximum value of the input item range of the modality where the page move request originated. In this case as well, changing input focus location in accordance with page movement enables the constant display of current focus location in the modality where the page move request originated, and facilitates input on a new page.

In Step S146, the granularity managing unit 28, when it has been determined that in a modality where the page move request did not originate, input focus exceeds input item range, the input item range for that modality is updated as follows:

(1) input item range when granularity is "1": [input focus location]; and (2) input item range when granularity is neither "1" nor "ALL": [input focus location+granularity definition number −1] from [input focus location] (however, when this exceeds number input items, number of input items is set as the maximum value)

In Step S147, the content generator 26 generates content for each modality.

In Step S148, the content transmitter 27 transmits content for each browser.

The content generation processing by the HTML browser 10 and VoiceXML browser 11 is identical to those of the first embodiment, and explanation thereof is omitted here.

Figure 33:
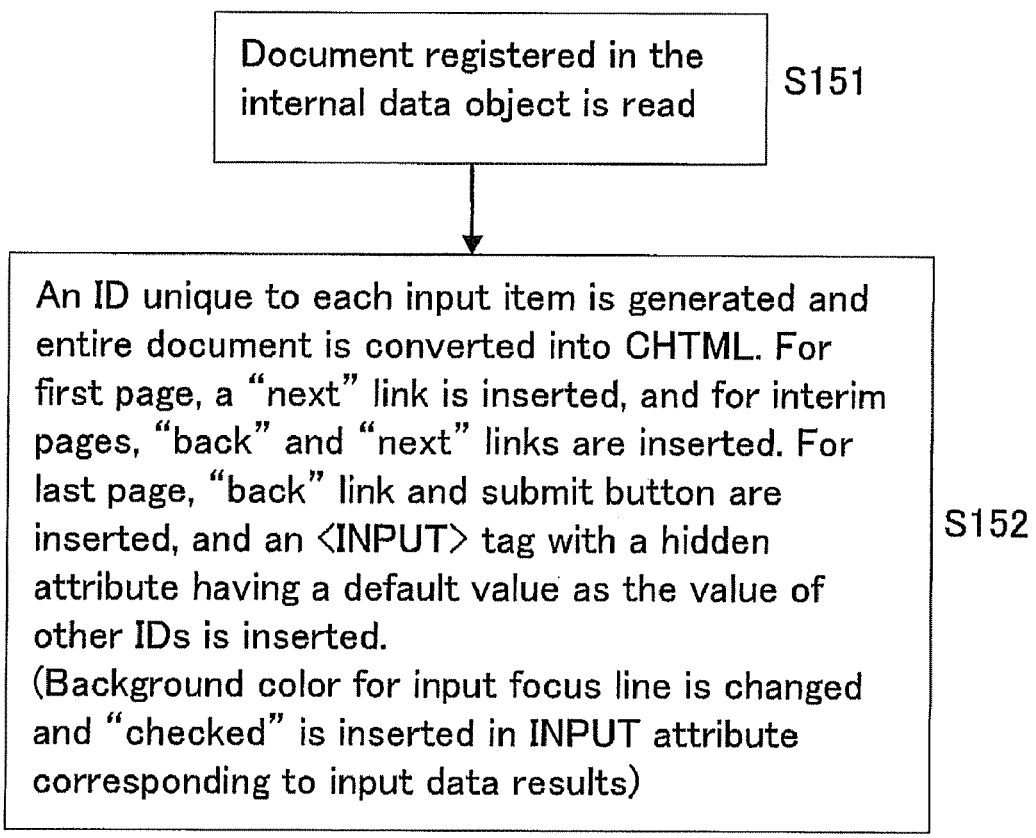
FIG. 33 is a control flowchart of a content generation process of CHTML.

Generation of content for the CHTML browser 12 will be explained with reference to the flowchart of FIG. 33.

In Step S151, the content generator 26 reads the document registered in an internal data object.

In Step S152, the content generator 26 generates a unique item ID for each input item, and converts input items within a CHTML input item range defined by the content granularity definition file 34 into CHTML content. At this time, to receive input of an instruction for a page move request, a "next" button (or link) is inserted in the first page, and "back" and "next" buttons (or links) are inserted in interim pages, and a "back" button (or link) and "submit" button are inserted in the last page. Also, by inserting input data of other pages input up to that point as an <INPUT> tag with a hidden attribute, all input data input to that point is transmitted as result data.

An example of content display in such a CHTML browser 12 will be explained with reference to FIG. 35. When a document identical to that displayed in the HTML browser 10 of the first embodiment is displayed in the CHTML browser 12, let us suppose that the input item range is 2. Let us further suppose that the internal data object in an initial state is configured such that, as shown in FIG. 36, for the document of document name "sheet1.xml," the focus location field is "1," the input item range for the CHTML browser 12 is from 1 to 2, and the input item range for the VoiceXML browser 11 is 1. In this case, as shown in FIG. 35A, display is made of the input item range of 1-2 and of the current input item, "Is it damaged?," with its background color changed. The CHTML content at this time is configured as shown in FIG. 37. Therewithin, the description "bgColor="#FFF00" " is a description for changing background color of input focus location, and the description "a href="page&command=nextpage" " is a description of a page move request button (or link) to the next page.

When input to the input item "id1" ("Is it damaged?") is completed, the internal data object is updated to a value as indicated in FIG. 38. Based on the internal data object, the content generator 26 generates CHTML content as shown in FIG. 39. Here, a "bgColor="#FFF00" " tag for changing background color is moved to the input item "id2". Such CHTML content is displayed by the CHTML browser 12 as shown in FIG. 35B. Here, the input result for input item "id1" is reflected and current input focus location has been moved to input item "id2".

In addition, when data input to input item "id2" has been completed, in the internal data object, as shown in FIG. 40, focus location is "3" and input item range of the CHTML browser 12 is "3". The page move request may be automatically transmitted from a browser when focus location exceeds a browser input item range; alternatively, the content generator 26 can generate content resulting from automatic page movement. FIG. 41 illustrates CHTML content generated based on such an internal data object. Here, values for input items "id1" and "id2," which are input data of different pages input earlier, are inserted as an <INPUT> tag having a hidden attribute, thereby enabling transmission of all the input data as result data when instructions for "submit" are made. An example of a display screen of the CHTML browser 12 is shown in FIG. 35C.

As described above, with the present invention, an existing voice modality browser (VoiceXML browser) and a GUI browser (Web browser) can be used to achieve finely granulized synchronization between voice and GUI, while making full use of GUI browsability. Further, input items of browsers with different granularity are synchronized, thereby improving data input efficiency.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A multimodal control device comprising for each modality type, a browser for interpreting content in accordance with modality type and performing interaction with a user, wherein content containing an input focus item currently subject to input is generated from document data having a plurality of data input items, which are stored in a storage unit, said content being within a data input item range in accordance with the characteristics of each modality, and output to each browser, the multimodal control device comprising:
a computer executing
moving input currently subject to input in the document data and managing the moved input item currently subject to input as an input focus item, in response to receiving a processing request from the browser;
referring to a content granularity definition file which stores a correspondency between the modality types and the data input item range of content to be generated in the modality;
specifying a data input item range containing the input focus item from the document data, according to the referred content granularity definition file;
generating content containing the specified data input item range; and
transmitting the generated content containing the specified data input item range to a browser corresponding to the modality to display the generated content.

2. The multimodal control device according to claim 1, wherein the input focus managing changes input focus item in response to detection of input of data in a data input item from any of the modalities.

3. The multimodal control device according to claim 2, wherein the content generating generates content to confirm whether to direct transmission of the input data to the corresponding browser with respect to content for a modality having a data input item range of 1, after completion of data input in the plurality of data input items.

4. The multimodal control device according to claim 3, wherein the content generating generates the content which includes the inputted data as transmission data, for transmission confirmation.

5. The multimodal control device according to claim 1, wherein the browsers include a browser for GUI modality, wherein the content generating generates a content for the browser for GUI modality, which includes a content clearly indicating a data input item corresponding to an input focus location.

6. The multimodal control device according to claim 5, wherein the content generating generates a content for the browser for GUI modality, which includes interim input results data embedded in an entry form as initial values.

7. The multimodal control device according to claim 1, wherein the content generating, when content for each browser is generated from document data comprising a plurality of input items, generates a character string unique to each data input item and generates the content which includes the generated character string as an input identifier common to all modalities.

8. The multimodal control device according to claim 1, wherein the document data comprises a definition file in which content corresponding to modality type is defined for each data input item, wherein the content generating, in accordance with modality type and input focus item, reads content for each modality corresponding to the relevant data input item from the definition file.

9. The multimodal control device according to claim 1, wherein the content generating generates the content which is embedded a program for notifying data of results of interim input into the data input items.

10. The multimodal control device according to claim 1, wherein the content generating generates the content which is embedded a program for detecting movement of input focus and notifying input focus item move information.

11. A multimodal control device comprising for each modality type, a browser for interpreting content generated from document data in accordance with modality type, the multimodal control device comprising:
a computer executing
moving input currently subject to input in the document data and managing the moved input item currently subject to input as an input focus item, in response to receiving a processing request from the browser;
referring to a content granularity definition file which stores a correspondency between the modality types and the data input item range of content to be generated in the modality;
specifying a data input range containing the input focus item from the document data, according to the referred content granularity definition file;
generating content containing the specified data input item range; and
transmitting the generated content containing the specified data input item range to a browser corresponding to the modality to display the generated content data.

12. A multimodal control method where for each modality type, a browser interprets content in accordance with modality type and interacts with a user, wherein content containing an input focus item currently subject to input is generated from document data having a plurality of data input items which are stored in a storage unit, said content being within a data input item range in accordance with the characteristics of each modality, and output to each browser, the multimodal control method comprising:

storing in a computer readable recording medium a content granularity definition file which stores a correspondency between the modality types and the data input item range of content to be generated in the modality by a computer processor; and executing by the computer processor operations of:

moving input currently subject to input in the document data and managing the moved input item currently subject to input as an input focus item, in response to receiving a processing request from the browser;

referring to the content granularity definition file which stores the correspondency between the modality types and the data input item range of content to be generated by the computer in the modality;

specifying a data input item range containing the input focus item from the document data, according to the referred content granularity definition file;

generating content containing the specified data input item range; and transmitting the generated content containing the specified data input item range to a browser corresponding to the modality to display the generated data.

13. A computer readable recording medium storing a program causing a computer to execute a multimodal control where for each modality type, a browser is provided for interpreting content in accordance with modality type and performing interaction with a user, wherein content containing an input focus item currently subject to input is generated and output in each browser from document data having a plurality of data input items, said content being within a data input item range in accordance with the characteristics of each modality, the computer readable recording medium that stores the program causes the computer to execute the multimodal control by:

moving input currently subject to input in the document data and managing the moved input item currently subject to input as an input focus item, in response to receiving a processing request from the browser;

referring to a content granularity definition file which stores a correspondency between the modality types and the data input item range of content to be generated in the modality;

specifying a data input item range containing the input focus item from the document data, according to the referred content granularity definition file;

generating content containing the specified data input item range; and transmitting the generated content to a browser corresponding to the modality to display the generated content.

\* \* \* \* \*